United States Patent
Narayan et al.

(10) Patent No.: US 12,137,088 B2
(45) Date of Patent: Nov. 5, 2024

(54) BROWSER INTEGRATION WITH CRYPTOGRAM

(71) Applicant: Visa International Service Association, San Francisco, CA (US)

(72) Inventors: Prasanna L. Narayan, San Ramon, CA (US); Ramji Sethuraman, Foster City, CA (US)

(73) Assignee: VISA INTERNATIONAL SERVICE ASSOCIATION, San Francisco, CA (US)

( * ) Notice: Subject to any disclaimer, the term of this patent is extended or adjusted under 35 U.S.C. 154(b) by 0 days.

(21) Appl. No.: 17/586,127

(22) Filed: Jan. 27, 2022

(65) Prior Publication Data

US 2022/0150236 A1 May 12, 2022

Related U.S. Application Data

(63) Continuation of application No. 16/400,730, filed on May 1, 2019, now Pat. No. 11,271,921, which is a
(Continued)

(51) Int. Cl.
*H04L 29/00* (2006.01)
*G06Q 20/02* (2012.01)
(Continued)

(52) U.S. Cl.
CPC ....... *H04L 63/0807* (2013.01); *G06Q 20/027* (2013.01); *G06Q 20/0855* (2013.01);
(Continued)

(58) Field of Classification Search
CPC . H04L 63/0807; H04L 63/0823; H04L 67/02; G06Q 20/027; G06Q 20/0855; G06Q 20/38215; G06Q 20/385
(Continued)

(56) References Cited

U.S. PATENT DOCUMENTS

| 5,280,527 A | 1/1994 | Gullman et al. |
| 5,613,012 A | 3/1997 | Hoffman et al. |

(Continued)

FOREIGN PATENT DOCUMENTS

| CN | 1853189 A | 10/2006 |
| CN | 101369272 A | 2/2009 |

(Continued)

OTHER PUBLICATIONS

"Payment Tokenisation Specification Technical Framework", Version 1.0, EMVCo, Retrieved from the Internet: https://media.scmagazine.com/documents/95/emvco_payment_tokenisation_spe_23619.pdf, Mar. 31, 2014, 84 pages.

(Continued)

*Primary Examiner* — Jeffrey C Pwu
*Assistant Examiner* — Michael D Anderson
(74) *Attorney, Agent, or Firm* — Kilpatrick Townsend & Stockton LLP

(57) ABSTRACT

This disclosure includes utilizing a token cryptogram with a browser to facilitate a transaction. A webpage of a website is configured to accept a token cryptogram in fields of the webpage. The webpage of the website may indicate that it is token-aware and is configured to accept the token cryptograms.

15 Claims, 5 Drawing Sheets

Related U.S. Application Data continuation of application No. 15/094,630, filed on Apr. 8, 2016, now Pat. No. 10,333,921.

(60) Provisional application No. 62/146,100, filed on Apr. 10, 2015.

(51) Int. Cl.
  *G06Q 20/08* (2012.01)
  *G06Q 20/38* (2012.01)
  *H04L 9/40* (2022.01)
  *H04L 67/02* (2022.01)

(52) U.S. Cl.
  CPC ..... *G06Q 20/38215* (2013.01); *G06Q 20/385* (2013.01); *H04L 63/0823* (2013.01); *H04L 67/02* (2013.01); *H04L 63/168* (2013.01)

(58) Field of Classification Search
  USPC .......................................................... 713/159
  See application file for complete search history.

(56) References Cited

U.S. PATENT DOCUMENTS

| | | |
|---|---|---|
| 5,781,438 A | 7/1998 | Lee et al. |
| 5,883,810 A | 3/1999 | Franklin et al. |
| 5,930,767 A | 7/1999 | Reber et al. |
| 5,953,710 A | 9/1999 | Fleming |
| 5,956,699 A | 9/1999 | Wong et al. |
| 6,000,832 A | 12/1999 | Franklin et al. |
| 6,014,635 A | 1/2000 | Harris et al. |
| 6,044,360 A | 3/2000 | Picciallo |
| 6,163,771 A | 12/2000 | Walker et al. |
| 6,227,447 B1 | 5/2001 | Campisano |
| 6,236,981 B1 | 5/2001 | Hill |
| 6,267,292 B1 | 7/2001 | Walker et al. |
| 6,327,578 B1 | 12/2001 | Linehan |
| 6,341,724 B2 | 1/2002 | Campisano |
| 6,385,596 B1 | 5/2002 | Wiser et al. |
| 6,397,261 B1 | 5/2002 | Eldridge et al. |
| 6,422,462 B1 | 7/2002 | Cohen |
| 6,425,523 B1 | 7/2002 | Shem-Ur et al. |
| 6,453,301 B1 | 9/2002 | Niwa |
| 6,493,760 B1 | 12/2002 | Pendlebury et al. |
| 6,592,044 B1 | 7/2003 | Wong et al. |
| 6,636,833 B1 | 10/2003 | Flitcroft et al. |
| 6,748,367 B1 | 6/2004 | Lee |
| 6,805,287 B2 | 10/2004 | Bishop et al. |
| 6,879,965 B2 | 4/2005 | Fung et al. |
| 6,891,953 B1 | 5/2005 | DeMello et al. |
| 6,901,387 B2 | 5/2005 | Wells et al. |
| 6,931,382 B2 | 8/2005 | Laage et al. |
| 6,938,019 B1 | 8/2005 | Uzo |
| 6,941,285 B2 | 9/2005 | Sarcanin |
| 6,980,670 B1 | 12/2005 | Hoffman et al. |
| 6,990,470 B2 | 1/2006 | Hogan et al. |
| 6,991,157 B2 | 1/2006 | Bishop et al. |
| 7,051,929 B2 | 5/2006 | Li |
| 7,069,249 B2 | 6/2006 | Stolfo et al. |
| 7,103,576 B2 | 9/2006 | Mann, III et al. |
| 7,113,930 B2 | 9/2006 | Eccles et al. |
| 7,136,835 B1 | 11/2006 | Flitcroft et al. |
| 7,177,835 B1 | 2/2007 | Walker et al. |
| 7,177,848 B2 | 2/2007 | Hogan et al. |
| 7,194,437 B1 | 3/2007 | Britto et al. |
| 7,209,561 B1 | 4/2007 | Shankar et al. |
| 7,264,154 B2 | 9/2007 | Harris |
| 7,287,692 B1 | 10/2007 | Patel et al. |
| 7,292,999 B2 | 11/2007 | Hobson et al. |
| 7,350,230 B2 | 3/2008 | Forrest |
| 7,353,382 B2 | 4/2008 | Labrou et al. |
| 7,379,919 B2 | 5/2008 | Hogan et al. |
| RE40,444 E | 7/2008 | Linehan |
| 7,415,443 B2 | 8/2008 | Hobson et al. |
| 7,444,676 B1 | 10/2008 | Asghari-Kamrani et al. |
| 7,469,151 B2 | 12/2008 | Khan et al. |
| 7,548,889 B2 | 6/2009 | Bhambri et al. |
| 7,552,333 B2 | 6/2009 | Wheeler et al. |
| 7,567,934 B2 | 7/2009 | Flitcroft et al. |
| 7,567,936 B1 | 7/2009 | Peckover et al. |
| 7,571,139 B1 | 8/2009 | Giordano et al. |
| 7,571,142 B1 | 8/2009 | Flitcroft et al. |
| 7,580,898 B2 | 8/2009 | Brown et al. |
| 7,584,153 B2 | 9/2009 | Brown et al. |
| 7,593,896 B1 | 9/2009 | Flitcroft et al. |
| 7,606,560 B2 | 10/2009 | Labrou et al. |
| 7,627,531 B2 | 12/2009 | Breck et al. |
| 7,627,895 B2 | 12/2009 | Gifford et al. |
| 7,650,314 B1 | 1/2010 | Saunders |
| 7,685,037 B2 | 3/2010 | Reiners et al. |
| 7,702,578 B2 | 4/2010 | Fung et al. |
| 7,707,120 B2 | 4/2010 | Dominguez et al. |
| 7,712,655 B2 | 5/2010 | Wong |
| 7,734,527 B2 | 6/2010 | Uzo |
| 7,753,265 B2 | 7/2010 | Harris |
| 7,770,789 B2 | 8/2010 | Oder, II et al. |
| 7,784,685 B1 | 8/2010 | Hopkins, III |
| 7,793,851 B2 | 9/2010 | Mullen |
| 7,801,826 B2 | 9/2010 | Labrou et al. |
| 7,805,376 B2 | 9/2010 | Smith |
| 7,805,378 B2 | 9/2010 | Berardi et al. |
| 7,818,264 B2 | 10/2010 | Hammad |
| 7,828,220 B2 | 11/2010 | Mullen |
| 7,835,960 B2 | 11/2010 | Breck et al. |
| 7,841,523 B2 | 11/2010 | Oder, II et al. |
| 7,841,539 B2 | 11/2010 | Hewton |
| 7,844,550 B2 | 11/2010 | Walker et al. |
| 7,848,980 B2 | 12/2010 | Carlson |
| 7,849,020 B2 | 12/2010 | Johnson |
| 7,853,529 B1 | 12/2010 | Walker et al. |
| 7,853,995 B2 | 12/2010 | Chow et al. |
| 7,865,414 B2 | 1/2011 | Fung et al. |
| 7,873,579 B2 | 1/2011 | Hobson et al. |
| 7,873,580 B2 | 1/2011 | Hobson et al. |
| 7,890,393 B2 | 2/2011 | Talbert et al. |
| 7,891,563 B2 | 2/2011 | Oder, II et al. |
| 7,896,238 B2 | 3/2011 | Fein et al. |
| 7,908,216 B1 | 3/2011 | Davis et al. |
| 7,922,082 B2 | 4/2011 | Muscato |
| 7,931,195 B2 | 4/2011 | Mullen |
| 7,937,324 B2 | 5/2011 | Patterson |
| 7,938,318 B2 | 5/2011 | Fein et al. |
| 7,954,705 B2 | 6/2011 | Mullen |
| 7,959,076 B1 | 6/2011 | Hopkins, III |
| 7,996,288 B1 | 8/2011 | Stolfo |
| 8,025,223 B2 | 9/2011 | Saunders et al. |
| 8,046,256 B2 | 10/2011 | Chien et al. |
| 8,060,448 B2 | 11/2011 | Jones |
| 8,060,449 B1 | 11/2011 | Zhu |
| 8,074,877 B2 | 12/2011 | Mullen et al. |
| 8,074,879 B2 | 12/2011 | Harris |
| 8,082,210 B2 | 12/2011 | Hansen et al. |
| 8,095,113 B2 | 1/2012 | Kean et al. |
| 8,104,679 B2 | 1/2012 | Brown |
| RE43,157 E | 2/2012 | Bishop et al. |
| 8,109,436 B1 | 2/2012 | Hopkins, III |
| 8,121,942 B2 | 2/2012 | Carlson et al. |
| 8,121,956 B2 | 2/2012 | Carlson et al. |
| 8,126,449 B2 | 2/2012 | Beenau et al. |
| 8,132,723 B2 | 3/2012 | Hogg et al. |
| 8,171,525 B1 | 5/2012 | Pelly et al. |
| 8,175,973 B2 | 5/2012 | Davis et al. |
| 8,190,523 B2 | 5/2012 | Patterson |
| 8,196,813 B2 | 6/2012 | Vadhri |
| 8,205,791 B2 | 6/2012 | Randazza et al. |
| 8,219,489 B2 | 7/2012 | Patterson |
| 8,224,702 B2 | 7/2012 | Mengerink et al. |
| 8,225,385 B2 | 7/2012 | Chow et al. |
| 8,229,852 B2 | 7/2012 | Carlson |
| 8,265,993 B2 | 9/2012 | Chien et al. |
| 8,280,777 B2 | 10/2012 | Mengerink et al. |
| 8,281,991 B2 | 10/2012 | Wentker et al. |
| 8,328,095 B2 | 12/2012 | Oder, II et al. |
| 8,336,088 B2 | 12/2012 | Raj et al. |

(56) References Cited

U.S. PATENT DOCUMENTS

| | | | |
|---|---|---|---|
| 8,346,666 B2 | 1/2013 | Lindelsee et al. |
| 8,376,225 B1 | 2/2013 | Hopkins, III |
| 8,380,177 B2 | 2/2013 | Laracey |
| 8,387,873 B2 | 3/2013 | Saunders et al. |
| 8,401,539 B2 | 3/2013 | Beenau et al. |
| 8,401,898 B2 | 3/2013 | Chien et al. |
| 8,402,555 B2 | 3/2013 | Grecia |
| 8,403,211 B2 | 3/2013 | Brooks et al. |
| 8,412,623 B2 | 4/2013 | Moon et al. |
| 8,412,837 B1 | 4/2013 | Emigh et al. |
| 8,417,642 B2 | 4/2013 | Oren |
| 8,433,116 B2 | 4/2013 | Butler et al. |
| 8,447,699 B2 | 5/2013 | Batada et al. |
| 8,453,223 B2 | 5/2013 | Svigals et al. |
| 8,453,925 B2 | 6/2013 | Fisher et al. |
| 8,458,487 B1 | 6/2013 | Palgon et al. |
| 8,484,134 B2 | 7/2013 | Hobson et al. |
| 8,485,437 B2 | 7/2013 | Mullen et al. |
| 8,494,959 B2 | 7/2013 | Hathaway et al. |
| 8,498,908 B2 | 7/2013 | Mengerink et al. |
| 8,504,475 B2 | 8/2013 | Brand et al. |
| 8,504,478 B2 | 8/2013 | Saunders et al. |
| 8,510,816 B2 | 8/2013 | Quach et al. |
| 8,528,067 B2 | 9/2013 | Hurry et al. |
| 8,533,860 B1 | 9/2013 | Grecia |
| 8,538,845 B2 | 9/2013 | Liberty |
| 8,555,079 B2 | 10/2013 | Shablygin et al. |
| 8,566,168 B1 | 10/2013 | Bierbaum et al. |
| 8,567,670 B2 | 10/2013 | Stanfield et al. |
| 8,571,939 B2 | 10/2013 | Lindsey et al. |
| 8,577,336 B2 | 11/2013 | Mechaley, Jr. |
| 8,577,803 B2 | 11/2013 | Chatterjee et al. |
| 8,577,813 B2 | 11/2013 | Weiss |
| 8,578,176 B2 | 11/2013 | Mattsson |
| 8,583,494 B2 | 11/2013 | Fisher |
| 8,584,251 B2 | 11/2013 | McGuire et al. |
| 8,589,237 B2 | 11/2013 | Fisher |
| 8,589,271 B2 | 11/2013 | Evans |
| 8,589,291 B2 | 11/2013 | Carlson et al. |
| 8,595,098 B2 | 11/2013 | Starai et al. |
| 8,595,812 B2 | 11/2013 | Bomar et al. |
| 8,595,850 B2 | 11/2013 | Spies et al. |
| 8,606,638 B2 | 12/2013 | Dragt |
| 8,606,700 B2 | 12/2013 | Carlson et al. |
| 8,606,720 B1 | 12/2013 | Baker et al. |
| 8,615,468 B2 | 12/2013 | Varadarajan |
| 8,620,754 B2 | 12/2013 | Fisher |
| 8,635,157 B2 | 1/2014 | Smith et al. |
| 8,646,059 B1 | 2/2014 | von Behren et al. |
| 8,651,374 B2 | 2/2014 | Brabson et al. |
| 8,656,180 B2 | 2/2014 | Shablygin et al. |
| 8,751,391 B2 | 6/2014 | Freund |
| 8,762,263 B2 | 6/2014 | Gauthier et al. |
| 8,793,186 B2 | 7/2014 | Patterson |
| 8,838,982 B2 | 9/2014 | Carlson et al. |
| 8,856,539 B2 | 10/2014 | Weiss |
| 8,887,308 B2 | 11/2014 | Grecia |
| 9,038,886 B2 | 5/2015 | Hammad |
| 9,065,643 B2 | 6/2015 | Hurry et al. |
| 9,070,129 B2 | 6/2015 | Sheets et al. |
| 9,100,826 B2 | 8/2015 | Weiss |
| 9,160,741 B2 | 10/2015 | Wentker et al. |
| 9,229,964 B2 | 1/2016 | Stevelinck |
| 9,245,267 B2 | 1/2016 | Singh |
| 9,249,241 B2 | 2/2016 | Dai et al. |
| 9,256,871 B2 | 2/2016 | Anderson et al. |
| 9,280,765 B2 | 3/2016 | Hammad |
| 9,530,137 B2 | 12/2016 | Weiss |
| 9,680,942 B2 | 6/2017 | Dimmick |
| 10,387,871 B2 | 8/2019 | Hammad |
| 10,477,393 B2 | 11/2019 | Lopez |
| 10,902,418 B2 | 1/2021 | Kaja et al. |
| 2001/0029485 A1 | 10/2001 | Brody et al. |
| 2001/0034720 A1 | 10/2001 | Armes |
| 2001/0054003 A1 | 12/2001 | Chien et al. |
| 2002/0007320 A1 | 1/2002 | Hogan et al. |
| 2002/0016749 A1 | 2/2002 | Borecki et al. |
| 2002/0029193 A1 | 3/2002 | Ranjan et al. |
| 2002/0035548 A1 | 3/2002 | Hogan et al. |
| 2002/0073045 A1 | 6/2002 | Rubin et al. |
| 2002/0116341 A1 | 8/2002 | Hogan et al. |
| 2002/0133467 A1 | 9/2002 | Hobson et al. |
| 2002/0147913 A1 | 10/2002 | Lun Yip |
| 2003/0028481 A1 | 2/2003 | Flitcroft et al. |
| 2003/0130955 A1 | 7/2003 | Hawthorne |
| 2003/0191709 A1 | 10/2003 | Elston et al. |
| 2003/0191945 A1 | 10/2003 | Keech |
| 2004/0010462 A1 | 1/2004 | Moon et al. |
| 2004/0039692 A1 | 2/2004 | Shields et al. |
| 2004/0050928 A1 | 3/2004 | Bishop et al. |
| 2004/0059682 A1 | 3/2004 | Hasumi et al. |
| 2004/0093281 A1 | 5/2004 | Silverstein et al. |
| 2004/0139008 A1 | 7/2004 | Mascavage, III |
| 2004/0143532 A1 | 7/2004 | Lee |
| 2004/0158532 A1 | 8/2004 | Breck et al. |
| 2004/0210449 A1 | 10/2004 | Breck et al. |
| 2004/0210498 A1 | 10/2004 | Freund |
| 2004/0232225 A1 | 11/2004 | Bishop et al. |
| 2004/0236632 A1 | 11/2004 | Maritzen et al. |
| 2004/0260646 A1 | 12/2004 | Berardi et al. |
| 2005/0037735 A1 | 2/2005 | Coutts |
| 2005/0080730 A1 | 4/2005 | Sorrentino |
| 2005/0108178 A1 | 5/2005 | York |
| 2005/0199709 A1 | 9/2005 | Linlor |
| 2005/0246293 A1 | 11/2005 | Ong |
| 2005/0256806 A1 | 11/2005 | Tien et al. |
| 2005/0269401 A1 | 12/2005 | Spitzer et al. |
| 2005/0269402 A1 | 12/2005 | Spitzer et al. |
| 2006/0235795 A1 | 10/2006 | Johnson et al. |
| 2006/0237528 A1 | 10/2006 | Bishop et al. |
| 2006/0278704 A1 | 12/2006 | Saunders et al. |
| 2007/0107044 A1 | 5/2007 | Yuen et al. |
| 2007/0129955 A1 | 6/2007 | Dalmia et al. |
| 2007/0136193 A1 | 6/2007 | Starr |
| 2007/0136211 A1 | 6/2007 | Brown et al. |
| 2007/0162961 A1* | 7/2007 | Tarrance .............. G06F 21/33 726/5 |
| 2007/0170247 A1 | 7/2007 | Friedman |
| 2007/0179885 A1 | 8/2007 | Bird et al. |
| 2007/0208671 A1 | 9/2007 | Brown et al. |
| 2007/0245414 A1 | 10/2007 | Chan et al. |
| 2007/0288377 A1 | 12/2007 | Shaked |
| 2007/0291995 A1 | 12/2007 | Rivera |
| 2008/0015988 A1 | 1/2008 | Brown et al. |
| 2008/0029607 A1 | 2/2008 | Mullen |
| 2008/0035738 A1 | 2/2008 | Mullen |
| 2008/0052226 A1 | 2/2008 | Agarwal et al. |
| 2008/0054068 A1 | 3/2008 | Mullen |
| 2008/0054079 A1 | 3/2008 | Mullen |
| 2008/0054081 A1 | 3/2008 | Mullen |
| 2008/0065554 A1 | 3/2008 | Hogan et al. |
| 2008/0065555 A1 | 3/2008 | Mullen |
| 2008/0201264 A1 | 8/2008 | Brown et al. |
| 2008/0201265 A1 | 8/2008 | Hewton |
| 2008/0228646 A1 | 9/2008 | Myers et al. |
| 2008/0243702 A1 | 10/2008 | Hart et al. |
| 2008/0245855 A1 | 10/2008 | Fein et al. |
| 2008/0245861 A1 | 10/2008 | Fein et al. |
| 2008/0283591 A1 | 11/2008 | Oder, II et al. |
| 2008/0302869 A1 | 12/2008 | Mullen |
| 2008/0302876 A1 | 12/2008 | Mullen |
| 2008/0313264 A1 | 12/2008 | Pestoni |
| 2009/0006262 A1 | 1/2009 | Brown et al. |
| 2009/0010488 A1 | 1/2009 | Matsuoka et al. |
| 2009/0037333 A1 | 2/2009 | Flitcroft et al. |
| 2009/0037388 A1 | 2/2009 | Cooper et al. |
| 2009/0043702 A1 | 2/2009 | Bennett |
| 2009/0048971 A1 | 2/2009 | Hathaway et al. |
| 2009/0106112 A1 | 4/2009 | Dalmia et al. |
| 2009/0106160 A1 | 4/2009 | Skowronek |
| 2009/0134217 A1 | 5/2009 | Flitcroft et al. |
| 2009/0157555 A1 | 6/2009 | Biffle et al. |
| 2009/0159673 A1 | 6/2009 | Mullen et al. |
| 2009/0159700 A1 | 6/2009 | Mullen et al. |

(56) References Cited

U.S. PATENT DOCUMENTS

| | | |
|---|---|---|
| 2009/0159707 A1 | 6/2009 | Mullen et al. |
| 2009/0173782 A1 | 7/2009 | Muscato |
| 2009/0200371 A1 | 8/2009 | Kean et al. |
| 2009/0248583 A1 | 10/2009 | Chhabra |
| 2009/0276347 A1 | 11/2009 | Kargman |
| 2009/0281948 A1 | 11/2009 | Carlson |
| 2009/0294527 A1 | 12/2009 | Brabson et al. |
| 2009/0307139 A1 | 12/2009 | Mardikar et al. |
| 2009/0308921 A1 | 12/2009 | Mullen |
| 2009/0327131 A1 | 12/2009 | Beenau et al. |
| 2010/0008535 A1 | 1/2010 | Abulafia et al. |
| 2010/0063895 A1 | 3/2010 | Dominguez et al. |
| 2010/0088237 A1 | 4/2010 | Wankmueller |
| 2010/0094755 A1 | 4/2010 | Kloster |
| 2010/0106644 A1 | 4/2010 | Annan et al. |
| 2010/0120408 A1 | 5/2010 | Beenau et al. |
| 2010/0133334 A1 | 6/2010 | Vadhri |
| 2010/0138347 A1 | 6/2010 | Chen |
| 2010/0145860 A1 | 6/2010 | Pelegero |
| 2010/0161433 A1 | 6/2010 | White |
| 2010/0185545 A1 | 7/2010 | Royyuru et al. |
| 2010/0211505 A1 | 8/2010 | Saunders et al. |
| 2010/0223186 A1 | 9/2010 | Hogan et al. |
| 2010/0228668 A1 | 9/2010 | Hogan et al. |
| 2010/0235284 A1 | 9/2010 | Moore |
| 2010/0258620 A1 | 10/2010 | Torreyson et al. |
| 2010/0291904 A1 | 11/2010 | Musfeldt et al. |
| 2010/0299267 A1 | 11/2010 | Faith et al. |
| 2010/0306076 A1 | 12/2010 | Taveau et al. |
| 2010/0325041 A1 | 12/2010 | Berardi et al. |
| 2011/0010292 A1 | 1/2011 | Giordano et al. |
| 2011/0016047 A1 | 1/2011 | Wu et al. |
| 2011/0016320 A1 | 1/2011 | Bergsten et al. |
| 2011/0040640 A1 | 2/2011 | Erikson |
| 2011/0047076 A1 | 2/2011 | Carlson et al. |
| 2011/0083018 A1 | 4/2011 | Kesanupalli et al. |
| 2011/0087596 A1 | 4/2011 | Dorsey |
| 2011/0093397 A1 | 4/2011 | Carlson et al. |
| 2011/0125597 A1 | 5/2011 | Oder, II et al. |
| 2011/0153437 A1 | 6/2011 | Archer et al. |
| 2011/0153496 A1 | 6/2011 | Royyuru |
| 2011/0153498 A1 | 6/2011 | Makhotin et al. |
| 2011/0154466 A1 | 6/2011 | Harper et al. |
| 2011/0161233 A1 | 6/2011 | Tieken |
| 2011/0178926 A1 | 7/2011 | Lindelsee et al. |
| 2011/0191244 A1 | 8/2011 | Dai |
| 2011/0238511 A1 | 9/2011 | Park et al. |
| 2011/0238573 A1 | 9/2011 | Varadarajan |
| 2011/0246317 A1 | 10/2011 | Coppinger |
| 2011/0258111 A1 | 10/2011 | Raj et al. |
| 2011/0272471 A1 | 11/2011 | Mullen |
| 2011/0272478 A1 | 11/2011 | Mullen |
| 2011/0276380 A1 | 11/2011 | Mullen et al. |
| 2011/0276381 A1 | 11/2011 | Mullen et al. |
| 2011/0276424 A1 | 11/2011 | Mullen |
| 2011/0276425 A1 | 11/2011 | Mullen |
| 2011/0295745 A1 | 12/2011 | White et al. |
| 2011/0302081 A1 | 12/2011 | Saunders et al. |
| 2012/0023567 A1 | 1/2012 | Hammad |
| 2012/0028609 A1 | 2/2012 | Hruska |
| 2012/0030047 A1 | 2/2012 | Fuentes et al. |
| 2012/0031969 A1 | 2/2012 | Hammad |
| 2012/0035998 A1 | 2/2012 | Chien et al. |
| 2012/0041881 A1 | 2/2012 | Basu et al. |
| 2012/0047237 A1 | 2/2012 | Arvidsson et al. |
| 2012/0066078 A1 | 3/2012 | Kingston et al. |
| 2012/0072350 A1 | 3/2012 | Goldthwaite et al. |
| 2012/0078735 A1 | 3/2012 | Bauer et al. |
| 2012/0078798 A1 | 3/2012 | Downing et al. |
| 2012/0078799 A1 | 3/2012 | Jackson et al. |
| 2012/0095852 A1 | 4/2012 | Bauer et al. |
| 2012/0095865 A1 | 4/2012 | Doherty et al. |
| 2012/0116902 A1 | 5/2012 | Cardina et al. |
| 2012/0123882 A1 | 5/2012 | Carlson et al. |
| 2012/0123940 A1 | 5/2012 | Killian et al. |
| 2012/0129514 A1 | 5/2012 | Beenau et al. |
| 2012/0143754 A1 | 6/2012 | Patel |
| 2012/0143767 A1 | 6/2012 | Abadir |
| 2012/0143772 A1 | 6/2012 | Abadir |
| 2012/0158580 A1 | 6/2012 | Eram et al. |
| 2012/0158593 A1 | 6/2012 | Garfinkle et al. |
| 2012/0173431 A1 | 7/2012 | Ritchie et al. |
| 2012/0185386 A1 | 7/2012 | Salama et al. |
| 2012/0197807 A1 | 8/2012 | Schlesser et al. |
| 2012/0203664 A1 | 8/2012 | Torossian et al. |
| 2012/0203666 A1 | 8/2012 | Torossian et al. |
| 2012/0215688 A1 | 8/2012 | Musser et al. |
| 2012/0215696 A1 | 8/2012 | Salonen |
| 2012/0221421 A1 | 8/2012 | Hammad |
| 2012/0226582 A1 | 9/2012 | Hammad |
| 2012/0231844 A1 | 9/2012 | Coppinger |
| 2012/0233004 A1 | 9/2012 | Bercaw |
| 2012/0246070 A1 | 9/2012 | Vadhri |
| 2012/0246071 A1 | 9/2012 | Jain et al. |
| 2012/0246079 A1 | 9/2012 | Wilson et al. |
| 2012/0265631 A1 | 10/2012 | Cronic et al. |
| 2012/0271770 A1 | 10/2012 | Harris et al. |
| 2012/0297446 A1 | 11/2012 | Webb et al. |
| 2012/0300932 A1 | 11/2012 | Cambridge et al. |
| 2012/0303503 A1 | 11/2012 | Cambridge et al. |
| 2012/0303961 A1 | 11/2012 | Kean et al. |
| 2012/0304273 A1 | 11/2012 | Bailey et al. |
| 2012/0310725 A1 | 12/2012 | Chien et al. |
| 2012/0310831 A1 | 12/2012 | Harris et al. |
| 2012/0316992 A1 | 12/2012 | Oborne |
| 2012/0317035 A1 | 12/2012 | Royyuru et al. |
| 2012/0317036 A1 | 12/2012 | Bower et al. |
| 2013/0017784 A1 | 1/2013 | Fisher |
| 2013/0018757 A1 | 1/2013 | Anderson et al. |
| 2013/0019098 A1 | 1/2013 | Gupta et al. |
| 2013/0031006 A1 | 1/2013 | McCullagh et al. |
| 2013/0054337 A1 | 2/2013 | Brendell et al. |
| 2013/0054454 A1 | 2/2013 | Purves et al. |
| 2013/0054466 A1 | 2/2013 | Muscato |
| 2013/0054474 A1 | 2/2013 | Yeager |
| 2013/0081122 A1 | 3/2013 | Svigals et al. |
| 2013/0091028 A1 | 4/2013 | Oder ("J.D."), II et al. |
| 2013/0110658 A1 | 5/2013 | Lyman et al. |
| 2013/0111599 A1 | 5/2013 | Gargiulo |
| 2013/0117185 A1 | 5/2013 | Collison et al. |
| 2013/0124290 A1 | 5/2013 | Fisher |
| 2013/0124291 A1 | 5/2013 | Fisher |
| 2013/0124364 A1 | 5/2013 | Mittal |
| 2013/0132274 A1 | 5/2013 | Henderson |
| 2013/0138525 A1 | 5/2013 | Bercaw |
| 2013/0144888 A1 | 6/2013 | Faith et al. |
| 2013/0145148 A1 | 6/2013 | Shablygin et al. |
| 2013/0145172 A1 | 6/2013 | Shablygin et al. |
| 2013/0159178 A1 | 6/2013 | Colon et al. |
| 2013/0159184 A1 | 6/2013 | Thaw |
| 2013/0166402 A1 | 6/2013 | Parento et al. |
| 2013/0166456 A1 | 6/2013 | Zhang et al. |
| 2013/0173736 A1 | 7/2013 | Krzeminski et al. |
| 2013/0185202 A1 | 7/2013 | Goldthwaite et al. |
| 2013/0191227 A1 | 7/2013 | Pasa et al. |
| 2013/0191286 A1 | 7/2013 | Cronic et al. |
| 2013/0191289 A1 | 7/2013 | Cronic et al. |
| 2013/0198071 A1 | 8/2013 | Jurss |
| 2013/0198080 A1 | 8/2013 | Anderson et al. |
| 2013/0200146 A1 | 8/2013 | Moghadam |
| 2013/0204787 A1 | 8/2013 | Dubois |
| 2013/0204793 A1 | 8/2013 | Kerridge et al. |
| 2013/0212007 A1 | 8/2013 | Mattsson et al. |
| 2013/0212017 A1 | 8/2013 | Bangia |
| 2013/0212019 A1 | 8/2013 | Mattsson et al. |
| 2013/0212024 A1 | 8/2013 | Mattsson et al. |
| 2013/0212026 A1 | 8/2013 | Powell et al. |
| 2013/0212666 A1 | 8/2013 | Mattsson et al. |
| 2013/0218698 A1 | 8/2013 | Moon et al. |
| 2013/0218769 A1 | 8/2013 | Pourfallah et al. |
| 2013/0226799 A1 | 8/2013 | Raj |
| 2013/0226813 A1 | 8/2013 | Voltz |
| 2013/0246199 A1 | 9/2013 | Carlson |
| 2013/0246202 A1 | 9/2013 | Tobin |

(56) References Cited

U.S. PATENT DOCUMENTS

| | | |
|---|---|---|
| 2013/0246203 A1 | 9/2013 | Laracey |
| 2013/0246258 A1 | 9/2013 | Dessert |
| 2013/0246259 A1 | 9/2013 | Dessert |
| 2013/0246261 A1 | 9/2013 | Purves et al. |
| 2013/0246267 A1 | 9/2013 | Tobin |
| 2013/0254028 A1 | 9/2013 | Salci |
| 2013/0254052 A1 | 9/2013 | Royyuru et al. |
| 2013/0254102 A1 | 9/2013 | Royyuru |
| 2013/0254117 A1 | 9/2013 | von Mueller et al. |
| 2013/0262296 A1 | 10/2013 | Thomas et al. |
| 2013/0262302 A1 | 10/2013 | Lettow et al. |
| 2013/0262315 A1 | 10/2013 | Hruska |
| 2013/0262316 A1 | 10/2013 | Hruska |
| 2013/0262317 A1 | 10/2013 | Collinge et al. |
| 2013/0275300 A1 | 10/2013 | Killian et al. |
| 2013/0275307 A1 | 10/2013 | Khan |
| 2013/0275308 A1 | 10/2013 | Paraskeva et al. |
| 2013/0282502 A1 | 10/2013 | Jooste |
| 2013/0282575 A1 | 10/2013 | Mullen et al. |
| 2013/0282588 A1 | 10/2013 | Hruska |
| 2013/0297501 A1 | 11/2013 | Monk et al. |
| 2013/0297504 A1 | 11/2013 | Nwokolo et al. |
| 2013/0297508 A1 | 11/2013 | Belamant |
| 2013/0304649 A1 | 11/2013 | Cronic et al. |
| 2013/0308778 A1 | 11/2013 | Fosmark et al. |
| 2013/0311382 A1 | 11/2013 | Fosmark et al. |
| 2013/0317982 A1 | 11/2013 | Mengerink et al. |
| 2013/0332344 A1 | 12/2013 | Weber |
| 2013/0339253 A1 | 12/2013 | Sincai |
| 2013/0346305 A1 | 12/2013 | Mendes |
| 2013/0346314 A1 | 12/2013 | Mogollon et al. |
| 2014/0007213 A1 | 1/2014 | Sanin et al. |
| 2014/0013106 A1 | 1/2014 | Redpath |
| 2014/0013114 A1 | 1/2014 | Redpath |
| 2014/0013452 A1 | 1/2014 | Aissi et al. |
| 2014/0019352 A1 | 1/2014 | Shrivastava |
| 2014/0025581 A1 | 1/2014 | Calman |
| 2014/0025585 A1 | 1/2014 | Calman |
| 2014/0025958 A1 | 1/2014 | Calman |
| 2014/0032417 A1 | 1/2014 | Mattsson |
| 2014/0032418 A1 | 1/2014 | Weber |
| 2014/0040137 A1 | 2/2014 | Carlson et al. |
| 2014/0040139 A1 | 2/2014 | Brudnicki et al. |
| 2014/0040144 A1 | 2/2014 | Plomske et al. |
| 2014/0040145 A1 | 2/2014 | Ozvat et al. |
| 2014/0040148 A1 | 2/2014 | Ozvat et al. |
| 2014/0040628 A1 | 2/2014 | Fort et al. |
| 2014/0041018 A1 | 2/2014 | Bomar et al. |
| 2014/0046853 A1 | 2/2014 | Spies et al. |
| 2014/0047551 A1 | 2/2014 | Nagasundaram et al. |
| 2014/0052532 A1 | 2/2014 | Tsai et al. |
| 2014/0052620 A1 | 2/2014 | Rogers et al. |
| 2014/0052637 A1 | 2/2014 | Jooste et al. |
| 2014/0068706 A1 | 3/2014 | Aissi |
| 2014/0074637 A1 | 3/2014 | Hammad |
| 2014/0108172 A1 | 4/2014 | Weber et al. |
| 2014/0114857 A1 | 4/2014 | Griggs et al. |
| 2014/0143137 A1 | 5/2014 | Carlson |
| 2014/0164243 A1 | 6/2014 | Aabye et al. |
| 2014/0188586 A1 | 7/2014 | Carpenter et al. |
| 2014/0249945 A1 | 9/2014 | Gauthier et al. |
| 2014/0294701 A1 | 10/2014 | Dai et al. |
| 2014/0297534 A1 | 10/2014 | Patterson |
| 2014/0310183 A1 | 10/2014 | Weber |
| 2014/0324690 A1 | 10/2014 | Allen et al. |
| 2014/0330721 A1 | 11/2014 | Wang |
| 2014/0330722 A1 | 11/2014 | Laxminarayanan et al. |
| 2014/0331265 A1 | 11/2014 | Mozell et al. |
| 2014/0337236 A1 | 11/2014 | Wong et al. |
| 2014/0344153 A1 | 11/2014 | Raj et al. |
| 2014/0372308 A1 | 12/2014 | Sheets |
| 2014/0372322 A1 | 12/2014 | Tieken et al. |
| 2015/0019443 A1 | 1/2015 | Sheets et al. |
| 2015/0032625 A1 | 1/2015 | Dill et al. |
| 2015/0032626 A1 | 1/2015 | Dill et al. |
| 2015/0032627 A1 | 1/2015 | Dill et al. |
| 2015/0046338 A1* | 2/2015 | Laxminarayanan ........................ G06Q 20/38215 705/67 |
| 2015/0046339 A1* | 2/2015 | Wong ................ G06Q 20/4016 705/44 |
| 2015/0052064 A1 | 2/2015 | Karpenko et al. |
| 2015/0081544 A1 | 3/2015 | Schulz et al. |
| 2015/0088756 A1 | 3/2015 | Makhotin et al. |
| 2015/0106239 A1 | 4/2015 | Gaddam et al. |
| 2015/0112870 A1 | 4/2015 | Nagasundaram et al. |
| 2015/0112871 A1 | 4/2015 | Kumnick |
| 2015/0120472 A1 | 4/2015 | Aabye et al. |
| 2015/0127529 A1 | 5/2015 | Makhotin et al. |
| 2015/0127547 A1 | 5/2015 | Powell et al. |
| 2015/0140960 A1 | 5/2015 | Powell et al. |
| 2015/0142673 A1 | 5/2015 | Nelsen et al. |
| 2015/0161597 A1 | 6/2015 | Subramanian et al. |
| 2015/0178724 A1 | 6/2015 | Ngo et al. |
| 2015/0180836 A1 | 6/2015 | Wong et al. |
| 2015/0186864 A1 | 7/2015 | Jones et al. |
| 2015/0193222 A1 | 7/2015 | Pirzadeh et al. |
| 2015/0195133 A1 | 7/2015 | Sheets et al. |
| 2015/0199679 A1 | 7/2015 | Palanisamy et al. |
| 2015/0199689 A1 | 7/2015 | Kumnick et al. |
| 2015/0220917 A1 | 8/2015 | Aabye et al. |
| 2015/0269566 A1 | 9/2015 | Gaddam et al. |
| 2015/0278799 A1 | 10/2015 | Palanisamy |
| 2015/0287037 A1 | 10/2015 | Salmon et al. |
| 2015/0312038 A1 | 10/2015 | Palanisamy |
| 2015/0319158 A1 | 11/2015 | Kumnick |
| 2015/0332262 A1 | 11/2015 | Lingappa |
| 2015/0356560 A1 | 12/2015 | Shastry et al. |
| 2015/0363781 A1 | 12/2015 | Badenhorst |
| 2016/0028550 A1 | 1/2016 | Gaddam et al. |
| 2016/0036790 A1 | 2/2016 | Shastry et al. |
| 2016/0042263 A1 | 2/2016 | Gaddam et al. |
| 2016/0065370 A1 | 3/2016 | Le Saint et al. |
| 2016/0092696 A1 | 3/2016 | Guglani et al. |
| 2016/0092872 A1 | 3/2016 | Prakash et al. |
| 2016/0092874 A1 | 3/2016 | O'Regan et al. |
| 2016/0103675 A1 | 4/2016 | Aabye et al. |
| 2016/0119296 A1 | 4/2016 | Laxminarayanan et al. |
| 2016/0132878 A1 | 5/2016 | O'Regan et al. |
| 2016/0140545 A1 | 5/2016 | Flurscheim et al. |
| 2016/0148197 A1 | 5/2016 | Dimmick |
| 2016/0148212 A1 | 5/2016 | Dimmick |
| 2016/0171479 A1 | 6/2016 | Prakash et al. |
| 2016/0173483 A1 | 6/2016 | Wong et al. |
| 2016/0197725 A1 | 7/2016 | Hammad |
| 2016/0210628 A1 | 7/2016 | McGuire |
| 2016/0217461 A1 | 7/2016 | Gaddam et al. |
| 2016/0218875 A1 | 7/2016 | Le Saint et al. |
| 2016/0224976 A1 | 8/2016 | Basu et al. |
| 2016/0224977 A1 | 8/2016 | Sabba et al. |
| 2016/0232527 A1 | 8/2016 | Patterson |
| 2016/0239842 A1 | 8/2016 | Cash et al. |
| 2016/0269391 A1 | 9/2016 | Gaddam et al. |
| 2016/0301683 A1 | 10/2016 | Laxminarayanan et al. |
| 2016/0308995 A1 | 10/2016 | Youdale et al. |
| 2017/0046696 A1 | 2/2017 | Powell et al. |
| 2017/0103387 A1 | 4/2017 | Weber |
| 2017/0109745 A1 | 4/2017 | Al-Bedaiwi et al. |
| 2017/0186001 A1 | 6/2017 | Reed et al. |
| 2017/0201520 A1 | 7/2017 | Chandoor et al. |
| 2017/0220818 A1 | 8/2017 | Nagasundaram et al. |
| 2017/0228723 A1 | 8/2017 | Taylor et al. |
| 2017/0295155 A1 | 10/2017 | Wong |
| 2017/0364903 A1 | 12/2017 | Lopez |
| 2018/0075081 A1 | 3/2018 | Chipman |
| 2018/0247303 A1 | 8/2018 | Raj et al. |
| 2018/0262334 A1 | 9/2018 | Hammad |
| 2018/0268405 A1 | 9/2018 | Lopez |

(56) References Cited

U.S. PATENT DOCUMENTS

| | | | |
|---|---|---|---|
| 2018/0324184 | A1 | 11/2018 | Kaja et al. |
| 2018/0324584 | A1 | 11/2018 | Lopez |

FOREIGN PATENT DOCUMENTS

| | | | |
|---|---|---|---|
| CN | 101427268 | A | 5/2009 |
| CN | 103270524 | A | 8/2013 |
| CN | 103282923 | A | 9/2013 |
| EP | 1028401 | A1 | 8/2000 |
| EP | 2156397 | A1 | 2/2010 |
| WO | 2000/014648 | A1 | 3/2000 |
| WO | 01/35304 | A1 | 5/2001 |
| WO | 01/35304 | A9 | 5/2002 |
| WO | 2004/042536 | A2 | 5/2004 |
| WO | 2004/051585 | A2 | 6/2004 |
| WO | 2005/001751 | A1 | 1/2005 |
| WO | 2006/113834 | A2 | 10/2006 |
| WO | 2009/032523 | A1 | 3/2009 |
| WO | 2010/078522 | A1 | 7/2010 |
| WO | 2012/068078 | A2 | 5/2012 |
| WO | 2012/098556 | A1 | 7/2012 |
| WO | 2012/142370 | A2 | 10/2012 |
| WO | 2012/167941 | A1 | 12/2012 |
| WO | 2013/048538 | A1 | 4/2013 |
| WO | 2013/056104 | A1 | 4/2013 |
| WO | 2013/119914 | A1 | 8/2013 |
| WO | 2013/179271 | A2 | 12/2013 |

OTHER PUBLICATIONS

"Petition for Inter Partes Review", U.S. Pat. No. 8,533,860 Challenging Claims 1-30 Under 35 U.S.C. § 312 and 37 C.F.R. § 42.104, Before the USPTO Patent Trial and Appeal Board, IPR 2016-00600, Feb. 17, 2016, 65 pages.
"System and Method Using Interaction Token", U.S. Appl. No. 15/585,077 mailed May 2, 2017, 36 pages.
"Integration of Verification Tokens With Mobile Communication Devices", U.S. Appl. No. 15/977,921, filed May 11, 2018, 112 pages.
"Embedding Cloud-Based Functionalities in a Communication Device", U.S. Appl. No. 16/020,796, filed Jun. 27, 2018, 153 pages.
"Management of Sensitive Data", U.S. Appl. No. 61/738,832, filed Dec. 18, 2012, 22 pages.
"Payments Bridge", U.S. Appl. No. 61/751,763 mailed Jan. 11, 2013, 64 pages.
"Issuer Over-the-Air Update Method and System", U.S. Appl. No. 61/892,407, filed Oct. 17, 2013, 28 pages.
"Methods and Systems for Authentication and Issuance of Tokens in a Secure Environment", U.S. Appl. No. 61/894,749, filed Oct. 23, 2013, 67 pages.
"Methods and Systems for Provisioning Mobile Devices With Payment Credentials and Payment Token Identifiers", U.S. Appl. No. 61/926,236, filed Jan. 10, 2014, 51 pages.
"Payment System Canonical Address Format" U.S. Appl. No. 62/000,288, filed May 19, 2014, 58 pages.
"Mobile Merchant Application", U.S. Appl. No. 62/003,717, filed May 28, 2014, 58 pages.
"Secure Transactions Using Mobile Devices", U.S. Appl. No. 62/024,426, filed Jul. 14, 2014, 102 pages.
"Sharing Payment Token", U.S. Appl. No. 62/037,033, filed Aug. 13, 2014, 36 pages.
"Customized Payment Gateway", U.S. Appl. No. 62/038,174, filed Aug. 15, 2014, 42 pages.
"Payment Device Authentication and Authorization System", U.S. Appl. No. 62/042,050, filed Aug. 26, 2014, 120 pages.
"Completing Transactions Without a User Payment Device" U.S. Appl. No. 62/053,736, filed Sep. 22, 2014, 31 pages.
"Mirrored Token Vault", U.S. Appl. No. 62/054,346, filed Sep. 23, 2014, 38 pages.
"Methods and Systems for Wallet Provider Provisioning", U.S. Appl. No. 62/103,522, filed Jan. 14, 2015, 39 pages.
"Wearables With NFC HCE", U.S. Appl. No. 62/108,403, filed Jan. 27, 2015, 32 pages.
"Token and Cryptogram Using Transaction Specific Information" U.S. Appl. No. 62/117,291, filed Feb. 17, 2015, 25 pages.
"Tokenizing Transaction Amounts", U.S. Appl. No. 62/128,709, filed Mar. 5, 2015, 30 pages.
Extended European Search Report for EP Patent Application No. EP16777394.4, mailed on Feb. 6, 2018, 8 pages.
International Preliminary Report on Patentability for PCT Application No. PCT/US2016/026725, mailed on Oct. 19, 2017, 10 pages.
International Search Report and Written Opinion for PCT Application No. PCT/US2016/026725, mailed on Jun. 30, 2016, 13 pages.
Written Opinion for Singapore Application No. SG11201706576T, mailed on May 16, 2018, 8 pages.
Final Office Action for U.S. Appl. No. 15/094,630 mailed on Jul. 18, 2018, 17 pages.
Non-Final Office Action for U.S. Appl. No. 15/094,630 mailed on Dec. 14, 2017, 20 pages.
Notice of Allowance for U.S. Appl. No. 15/094,630 mailed on Feb. 6, 2019, 9 pages.
Notice of Decision to Grant for CN Application No. CN201680020298.X mailed on Aug. 27, 2020, 6 pages.
Office Action mailed on Mar. 5, 2020 for Chinese Application No. CN201680020298.X, 27 pages.
Notice of Acceptance for Australian Patent Application No. AU2021218146, dated Nov. 30, 2022, 3 pages.

\* cited by examiner

BROWSER INTEGRATION WITH CRYPTOGRAM

CROSS-REFERENCES TO RELATED APPLICATIONS

The present application is a continuation of U.S. Non-Provisional application Ser. No. 16/400,730, filed May 1, 2019, which is a continuation of U.S. Non-Provisional application Ser. No. 15/094,630, filed Apr. 8, 2016, which is a non-provisional application of and claims priority to U.S. Provisional Application No. 62/146,100, filed on Apr. 10, 2015, the entire contents of which are herein incorporated by reference for all purposes.

BACKGROUND

Transactions often require that a user provide sensitive data to execute the transaction. Sensitive data may be an access code to a building or payment details, for example. In some cases, personal user information may be handled by multiple entities, including third parties. When the sensitive data is in electronic form, multiple computing devices, networks, and/or entities are sometimes given access to the sensitive information. Thus, it is desirable that the number of networks, computing devices, and/or entities that have access to such sensitive data be reduced in order to limit the access to the sensitive data.

Embodiments of the invention address this and other problems, individually and collectively.

BRIEF SUMMARY

Embodiments of the present invention relate to systems and methods for conducting a transaction a browser configured to be integrated with a token cryptogram. According to one embodiment of the invention, a server computer receives authentication credentials from a user. The authentication credentials may be from a web-browser or an operating system (OS) that a user is utilizing in a computing environment. The server computer may identify that the website accessed by the user is "token-aware." The server computer may provide a transaction data identifier associated with the authentication credentials to the website. The transaction data identifier may identify underlying transaction data. The user may select or confirm the transaction data identifier presented by a website in order to select the underlying transaction data to be used in a transaction. The server computer may receive this confirmation that the transaction data is approved by the user to complete the transaction. The server computer may send a token and a cryptogram request to a processing network. The token may be linked to the transaction data associated with the authentication credentials. The server computer receives from the processing network a token cryptogram based on the token. The server computer provides the token cryptogram and tokenized payment credentials to data fields of a webpage of the website. The fields may be hidden fields in that they are not visible to the users viewing the website. In one embodiment, the server computer identifying that a website is token-aware may include analyzing a HyperText Markup Language (html) tag of the website.

According to one embodiment of the invention, a transaction data identifier is received from a server computer. The transaction data identifier may be associated with authentication credentials verified by the server computer. The authentication credentials may be obtained from login information that a user provides to a browser or an operating system of a computing environment. A transaction completion interface of a website may be provided to a computing device such as a personal computer, smartphone, tablet, or otherwise. The transaction completion interface makes the transaction data identifier viewable to a user of the computing device. The transaction data identifier identifies underlying transaction data. A confirmation from the user that the transaction data is approved to complete the transaction is received and transmitted to the server computer. An indication that a website is token-aware is also provided to the server computer. A token cryptogram and tokenized payment credentials are received in data fields of a webpage of the website. The fields may be hidden fields that are not rendered for viewing by the user. An authorization request is sent to an acquirer computer. The authorization request includes the token cryptogram, the tokenized payment credentials, and a unique identifier of the website. An authorization response from the acquirer computer may be received that either approves or declines the transaction.

These and other embodiments of the invention are described in further detail below.

DETAILED DESCRIPTION

Figure 1:
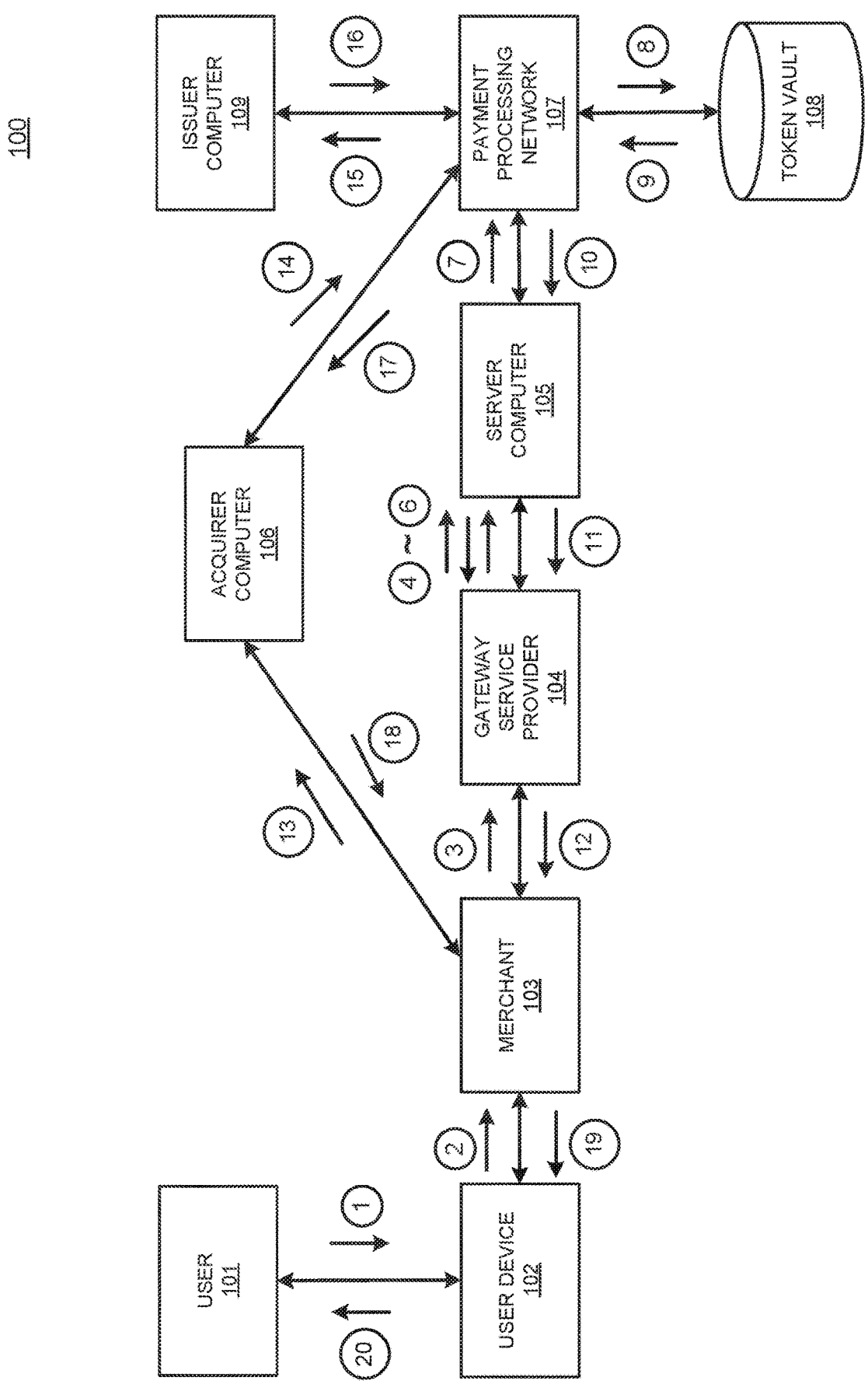
FIG. 1 shows a block diagram of a system and a flowchart according to embodiments of the disclosure.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Embodiments of the present invention are directed to systems, methods, apparatuses, and computer readable media for utilizing a token cryptogram with a browser to facilitate a transaction. During a transaction, sensitive data may be used and limiting the number of entities or computing devices that have access to the sensitive data reduces the exposure of the sensitive data for improper use. Some examples of the disclosure are directed to transactions initiated by a user with a browser. Conventionally, to complete a transaction, a user enters their payment details (e.g. credit card number, expiration, billing address, shipping address, etc.) into a browser form. In addition to consuming a significant amount of the user's time to enter the details, entering this sensitive data into the browser potentially gives a merchant, a Payment Service Provider, and the networks connecting those entities access to the sensitive data. Reducing the number of entities, networks, and computing systems that have access to the sensitive data is desirable.

In one embodiment of the disclosure, a user is logged into a browser or an operating system and initiates a transaction. The publisher of the browser or operating system may have access to transaction data (e.g. a credit/debit card on file) that is associated with the authentication credentials of the logged in user. A server computer of the publisher of the browser or operating system may provide a transaction data identifier (e.g. last four digits of the card on file) to the browser so that the user can select the card on file to be used in the transaction, Once the user selects the card on file via the transaction data identifier, the server computer may send a token and a cryptogram request to a payment processing network. The token is linked to the card on file that is associated with the user account and authentication credentials. A token cryptogram based on the token is received from the payment processing network at the server computer. The server computer can then provide the token cryptogram (and other secure payment details) to hidden form fields of the browser to facilitate the transaction. The hidden form fields of the browser are not visible to a user viewing the website rendered by the browser. In the disclosure, webpages are configured to accept a token cryptogram payload in hidden form fields and browsers are configured to identify websites or webpages that can accept token cryptogram payloads and provide the token cryptogram to the website. The websites may provide an indication to browsers that the website is "token-aware" in that in can accept a token cryptogram to facilitate a transaction. In this way, the merchants and associated websites are provided the required information to complete a transaction using secure data (e.g. token and cryptograms) while not having access to the actual underlying sensitive transaction data (e.g. card on file data).

Before discussing specific embodiments and examples, some descriptions of terms used herein are provided below.

An "authorization request message" may be an electronic message that is sent to a payment processing network and/or an issuer of a payment card to request authorization for a transaction. An authorization request message according to some embodiments may comply with (International Organization of Standardization) ISO 8583, which is a standard for systems that exchange electronic transaction information associated with a payment made by a consumer using a payment device or payment account. The authorization request message may include an issuer account identifier that may be associated with a payment device or payment account. An authorization request message may also comprise additional data elements corresponding to "identification information" including, by way of example only: a service code, a CVV (card verification value), a dCVV (dynamic card verification value), an expiration date, etc. An authorization request message may also comprise "transaction information," such as any information associated with a current transaction, such as the transaction amount, merchant identifier, merchant location, etc., as well as any other information that may be utilized in determining whether to identify and/or authorize a transaction.

An "authorization response message" may be an electronic message reply to an authorization request message generated by an issuing financial institution or a payment processing network. The authorization response message may include, by way of example only, one or more of the following status indicators: Approval—transaction was approved; Decline—transaction was not approved; or Call Center—response pending more information, merchant must call the toll-free authorization phone number. The authorization response message may also include an authorization code, which may be a code that a credit card issuing bank returns in response to an authorization request message in an electronic message (either directly or through the payment processing network) to the merchant's access device (e.g. POS equipment) that indicates approval of the transaction. The code may serve as proof of authorization. As noted above, in some embodiments, a payment processing network may generate or forward the authorization response message to the merchant.

A "token" may include a substitute identifier for some information. For example, a payment token may include an identifier for a payment account that is a substitute for an account identifier, such as a primary account number (PAN). For instance, a token may include a series of alphanumeric characters that may be used as a substitute for an original account identifier. For example, a token "4900 0000 0000 0001" may be used in place of a PAN "4147 0900 0000 1234." In some embodiments, a token may be "format preserving" and may have a numeric format that conforms to the account identifiers used in existing payment processing networks (e.g., ISO 8583 financial transaction message format). In some embodiments, a token may be used in place of a PAN to initiate, authorize, settle or resolve a payment transaction. The token may also be used to represent the original credential in other systems where the original credential would typically be provided. In some embodiments, a token value may be generated such that the recovery of the original PAN or other account identifier from the token value may not be computationally derived. In other embodiments, a token may be a substitute for non-financial information such as social security numbers, home addresses, birthdays, etc.

A "cryptogram" may refer to an encrypted representation of some information. A cryptogram can be used by a recipient to determine if the generator of the cryptogram is in possession of a proper key, for example, by encrypting the underlying information with a valid key, and comparing the result to the received cryptogram. A cryptogram may be sent from a payment processing network for use by a merchant in response to the merchant requesting a cryptogram for a specific transaction. The cryptogram may only be valid for the specific transaction.

"Payment credentials" may include any suitable information associated with an account (e.g. a payment account and/or payment device associated with the account). Such information may be directly related to the account or may be derived from information related to the account. Examples of account information may include a PAN (primary account number or "account number"), user name, expiration date, CVV (card verification value), dCVV (dynamic card verification value), CVV2 (card verification value 2), CVC3 card verification values, etc. CVV2 is generally understood to be a static verification value associated with a payment device. CVV2 values are generally visible to a user (e.g., a consumer), whereas CVV and dCVV values are typically embedded in memory or authorization request messages and are not readily known to the user (although they are known to the issuer and payment processors). Payment credentials may be any information that identifies or is associated with a payment account. Payment credentials may be provided in order to make a payment from a payment account. Payment credentials can also include a user name, an expiration date, a gift card number or code, and any other suitable information.

A "mobile device" may comprise any electronic device that may be transported and operated by a user, which may also provide remote communication capabilities to a network. Examples of remote communication capabilities include using a mobile phone (wireless) network, wireless data network (e.g., 3G, 4G or similar networks), Wi-Fi, Wi-Max, or any other communication medium that may provide access to a network such as the Internet or a private network. Examples of mobile devices include mobile phones (e.g., cellular phones), PDAs, tablet computers, net books, laptop computers, personal music players, hand-held specialized readers, wearable devices (e.g., watches), vehicles (e.g., cars), etc. A mobile device may comprise any suitable hardware and software for performing such functions, and may also include multiple devices or components (e.g., when a device has remote access to a network by tethering to another device i.e., using the other device as a relay—both devices taken together may be considered a single mobile device).

The term "server computer" may include a powerful computer or cluster of computers. For example, the server computer can be a large mainframe, a minicomputer cluster, or a group of servers functioning as a unit. In one example, the server computer may be a database server coupled to a Web server. The server computer may be coupled to a database and may include any hardware, software, other logic, or combination of the preceding for servicing the requests from one or more client computers. The server computer may comprise one or more computational apparatuses and may use any of a variety of computing structures, arrangements, and compilations for servicing the requests from one or more client computers.

An "acquirer" is typically a business entity (e.g., a commercial bank) that has a business relationship with a particular merchant.

An "issuer" is typically a business entity (e.g., a bank or credit union) which issues a payment device (such as a credit card, debit card, smart card, prepaid device or contactless device) to an account owner and which provides administrative and management functions for the payment account. Some entities may perform both issuer and acquirer functions. A payment account may be any account usable in a transaction, such as a credit, debit or prepaid account.

FIG. 1 illustrates an exemplary system 100 with at least some of the components for implementing embodiments of the invention. FIG. 1 includes a user 101, a user device 102, a merchant 103, a gateway service provider 104, a server computer 105, an acquirer computer 106, a payment processing network 107, a token vault 108, and an issuer computer 109. Any of the entities may be in communication by a suitable communications network.

User 101 (which may alternatively be referred to as a consumer) may be associated with user device 102 and may conduct a transaction utilizing user device 102. In some embodiments, user 101 may utilize user device 102 to access a webpage or mobile application operated by merchant 103 or gateway service provider 104 to conduct a transaction. User 101 may have a user account associated with user device 102 issued by server computer 105, which may authenticate user 101 based on the user account.

User device 102 may be any suitable device that has wireless communication capabilities. User device 102 may be associated with a user account that can be authenticated by server computer 105. User 101 may be logged into an operating system of device 102 or user 101 may be logged into a browser running on an operating system of device 102, for example. User 101 may also have a user account associated with an application or mobile application of device 102. Server computer 105 may be operated by a publisher/manufacturer of an operating system or web browser running on the operating system of device 102. In some implementations, user device 102 may be configured to communicate with one or more cellular networks. User device 102 may be utilized by user 101 to access a webpage operated by merchant 103 or gateway service provider 104. User device 102 may also comprise a memory element comprising information or code for implementing any methods described herein. User device 102 may run any suitable operating system and browser. In some embodiments, one or more of the operating system and the browser may be capable of identifying websites that are enabled to receive a payload that includes a cryptogram. The website may be enabled to receive the cryptogram in a hidden field of a webpage of the website that is not viewable to a user of the website.

Some non-limiting examples of user device 102 may include mobile devices (e.g., cellular phones, keychain devices, personal digital assistants (PDAs), pagers, notebooks, laptops, notepads, smart watches, fitness bands, jewelry, etc.), automobiles with remote communication capabilities, personal computers, and the like.

Merchant 103 may operate a merchant computer configured to receive transaction data from user 101. Merchant 103 may engage in transactions, sell goods or services, or provide access to goods or services to the consumer. Merchant 103 may sell goods and/or services via a website, and may accept payments over the Internet. Merchant 103 may accept multiple forms of payment and may use multiple tools to conduct different types of transactions. Merchant 103 may also operate a physical store for in-person transactions.

Gateway service provider 104 (which may also be referred to as a gateway") may operate a merchant webpage (e.g., checkout page) on behalf of merchant 103. Gateway service provider 104 may also be considered a Payment Service Provider (PSP) that provides online services for accepting electronic payments. In some embodiments, gateway service provider 104 may be a payment gateway that initiates a transaction conducted by user 101. Gateway service provider 104 may communicate with server computer 105 to send and receive information associated with user 101, such as a payload including a token cryptogram.

In some contexts, large merchants 103 may be highly integrated with gateway service provider 104 such that they are the same entity and operated by a single computer. In a different context, a smaller merchant has a website that includes a checkout widget of the gateway service provider 104. In this context, the website may be operated on a web server that is remote from a computer running the checkout widget of the gateway service provider 104.

Server computer 105 may be any suitable computer having wired and/or wireless communication capabilities and may be capable of conducting any of the methods described herein. In some embodiments, server computer 105 may be a token requester with card-on-file (COF) and a browser/operating system provider.

Server computer 105 may be capable of authenticating user 101 utilizing user device 102. Server computer 105 may maintain a user account associated with user 101. In some embodiments, server computer 105 may authenticate user 101 when user 101 signs in to their user account by providing authentication credentials (e.g., password, PIN, biometric identifier, etc.). In some cases, server computer 105 may be a wallet server, that may store other information (e.g., card-on-file data) associated with the authentication credentials of the user account that may also be utilized to authenticate user 101. In some embodiments, the stored information may be tokenized. For example, server computer 105 may store a tokenized version of a Primary Account Number (PAN) of a Card-On-File (COF) without storing all the payment credentials of the COF.

Server computer 105 may communicate with payment processing network 107 by sending a token to payment processing network 107 and receiving a token cryptogram based on the token. The token cryptogram may be sent in a payload to merchant 103 or gateway service provider 104.

Acquirer computer 106 is typically a system for an entity (e.g., a bank) that has a business relationship with a particular merchant or other entity. Acquirer computer 106 may route an authorization request for a transaction to issuer computer 109 via payment processing network 107.

Payment processing network 107 may include data processing subsystems, networks, and operations used to support and deliver authorization services, and clearing and settlement services. In some embodiments, payment processing network 107 may be in communication with token vault 108 that may store the binding between a token and an associated account number of user 101. Payment processing network 107 may comprise information or code that enables generation of a token cryptogram based on a received token.

Token vault 108 may comprise any information related to tokens. For example, token vault 108 may store tokens associated with user 101 and a mapping of the tokens to their associated payment accounts. Token vault 108 may comprise any sensitive information (e.g., account number) associated with the tokens. In some embodiments, payment processing network 107 may communicate with token vault 108 to de-tokenize a token. Token vault 108 may de-tokenize the token by determining information associated with the token based on the stored mapping. In some embodiments, token vault 108 may reside at payment processing network 110.

Issuer computer 109 is typically a computer run by a business entity (e.g., a bank) that may have issued the payment (credit/debit) card, account numbers or payment tokens used for the transactions. Some systems can perform both issuer computer 109 and acquirer computer 106 functions. When a transaction involves a payment account associated with issuer computer 109, issuer computer 109 may verify the account and respond with an authorization response message to acquirer computer 106 that may be forwarded to merchant 103 or gateway service provider 104, if applicable.

In some cases, a clearing and settlement process can occur between acquirer computer 106, payment processing network 107, and issuer computer 109. The communications network of system 100 may comprise a plurality of networks for secure communication of data and information between entities. In some embodiments, the communications network may follow a suitable communication protocol to generate one or more secure communication channels. Any suitable communications protocol may be used for generating a communications channel. A communication channel may in some instance comprise a "secure communication channel," which may be established in any known manner, including the use of mutual authentication and a session key and establishment of an SSL session. However, any method of creating a secure channel may be used. By establishing a secure channel, sensitive information related to user 101 may be more securely transmitted.

Figure 2:
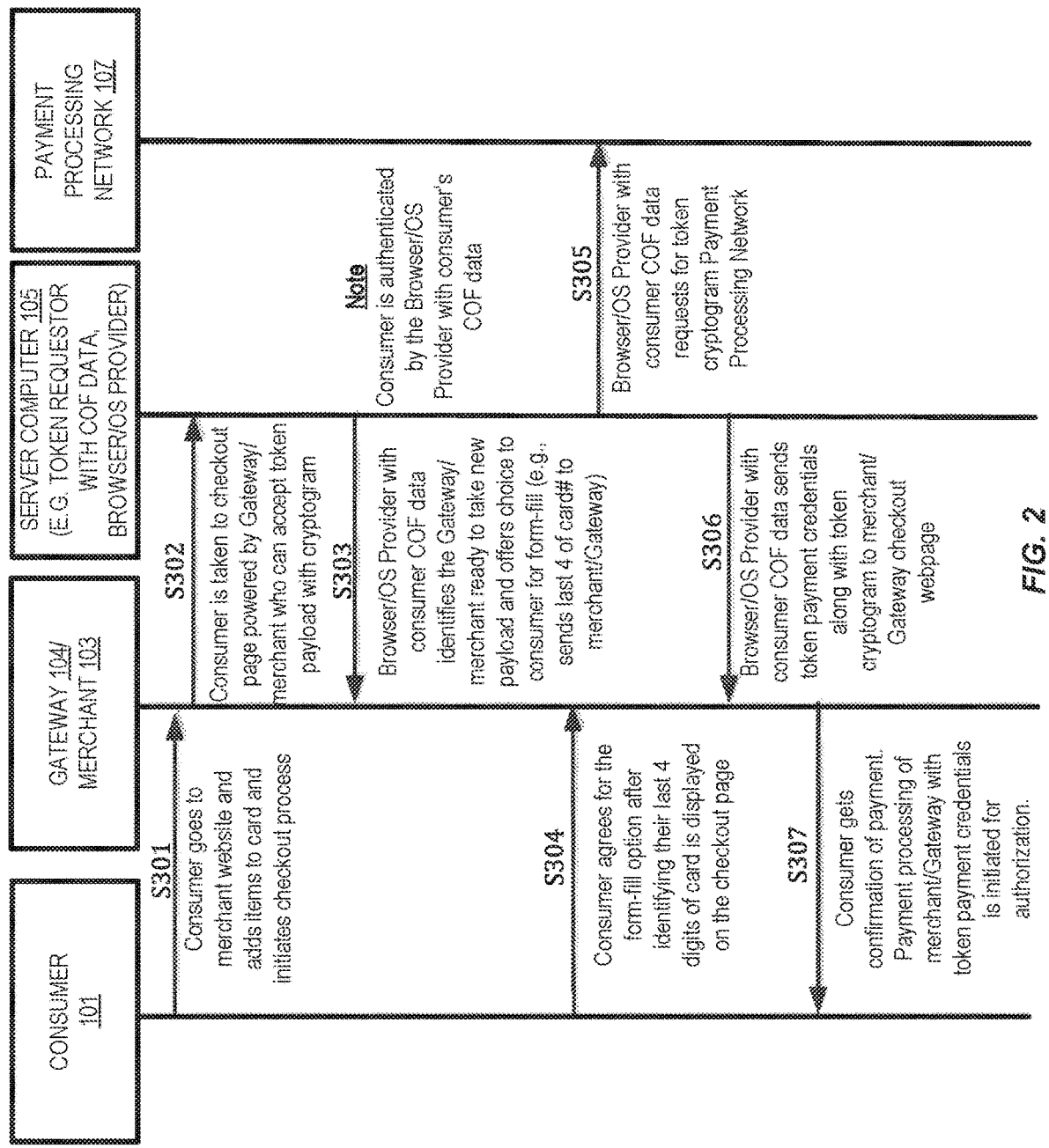
FIG. 2 shows a flowchart according to embodiments of the disclosure.

A method according to the embodiments of the invention can be described with respect to FIG. 1 and FIG. 2. FIG. 1 shows a flowchart of a method (steps 1~20) for enabling an e-commerce transaction utilizing a token cryptogram based on a token according to embodiments of the present invention. FIG. 2 shows a flowchart 200 of a method that can also be described with respect to FIG. 1 (indicated by S301~S307). User 101 may also be referred to as a consumer.

Additional methods and processes may be included within these methods and may be recognized by one of ordinary skill in the art, in light of the description below. Further, in some embodiments of the disclosure, the described methods may be combined, mixed, and matched, as one of ordinary skill would recognize.

At step 1, user 101 may operate user device 102. User 101 may access a website associated with merchant 103 and operated by gateway service provider 104 using the user device 102. In some cases, the website may be operated by merchant 103. In some embodiments, user 101 may sign in to a user account issued by server computer 105 while utilizing user device 102. The sign in process may comprise user 101 entering enrolled authentication credentials into a browser.

At step 2, user device 102 may send a request to conduct a transaction with merchant 103. User 101 may interact with the browser displaying a webpage to conduct a transaction (e.g., e-commerce transaction). In some cases, user 101 may activate a software button that opens the webpage (or service) and triggers the request to be sent. For example, user 101 may access a merchant website and add items to a card and initiate a checkout process (S301). The webpage may include one or more information fields that may request information surrounding user 101. Any other relevant information surrounding user 101 may be communicated to merchant 103.

At step 3, merchant 103 may communicate with gateway service provider 104 to take user 101 to an appropriate webpage. For example, user 101 may be taken to a checkout page powered by gateway service provider 104 (or merchant 103) (S302). The checkout page is an example of a transaction completion interface of the website that may be rendered in the browser, Gateway service provider 104 may be capable of accepting a payload with a token cryptogram. In some embodiments, merchant 103 may provide any other suitable information to gateway service provider 104, which may operate the website on behalf of merchant 103. In some embodiments, user device 102 may directly communicate with gateway service provider 104.

At step 4, gateway service provider 104 may communicate with server computer 105 to authenticate user 101. User 101 may be signed in to their user account issued by server computer 105. Server computer 105 may authenticate user 101 by information (e.g., enrollment data, sign-in credentials) associated with the user account (indicated by "Note" in FIG. 2). In some embodiments, server computer 105 may have stored information (e.g., card-on-file data) associated with the user account of user 101. In some cases, the information may be real payment account information, which can be tokenized. In other cases, some or all of the information may already be tokenized.

At step 5, server computer 105 may identify that the website operated by gateway service provider 104 (or merchant 103) is "token-aware" and therefore enabled to accept a token cryptogram (S303). In the context of this disclosure, a "token-aware" website is configured to accept a token cryptogram in field of a webpage of the website. In some embodiments, the data field is a hidden field in that it is not viewable to the user. In one embodiment, the website includes a unique identifier and the website is identified as a token-aware website by transmitting the unique identifier to payment processing network to verify the unique identifier. In one embodiment, a "token-aware" website identifies itself by including a HypterText Markup Language (HTML) tag within the website. In one embodiment, the HTML tag functions as the unique identifier. The HTML tag may also verifies the identity of the website and establish the website as a trusted website. In yet another embodiment, identifying the website as token-aware includes receiving an Extend Validation Certificate (EVC) from the website.

Still referring to step 5, server computer 105 may provide one or more transaction data identifiers associated with the authentication credentials of the user account to gateway service provider 104 after identifying that the website is token-aware. In one embodiment, the transaction data identifier can be the last four digits of a PAN and identifies that particular account for use in the pending transaction.

Figure 3:
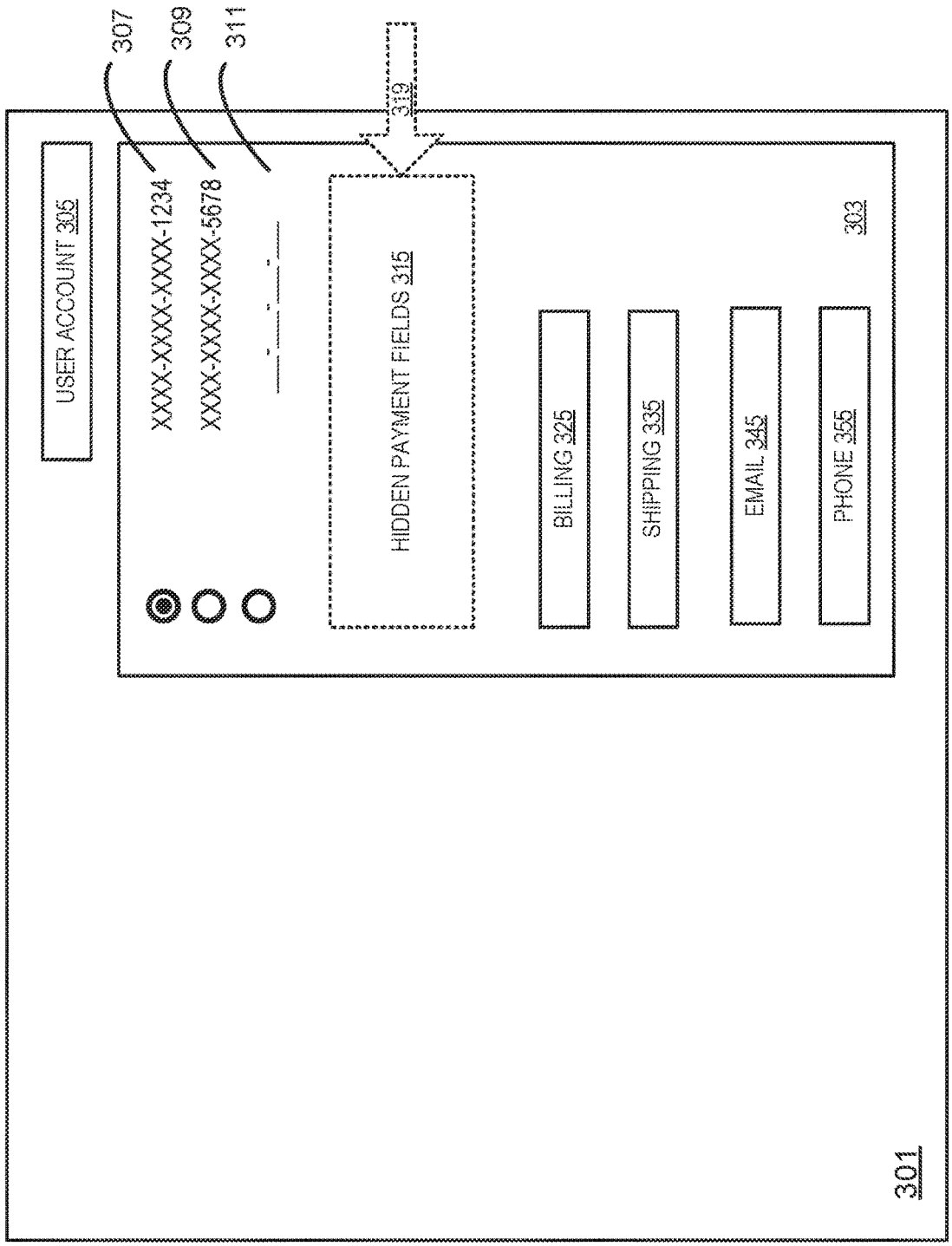
FIG. 3 shows an example transaction interface for use with a token cryptogram, in accordance with embodiments of the disclosure.

Referring to FIG. 3, website webpage 301 includes a transaction completion interface 303 that includes transaction data identifiers 307 and 309, which are the last four digits of different PANs that are associated with the user account 305 and the authentication credentials of the user account 305. Server computer 105 may store the last four digits of a PAN, but not store the complete PAN. User 101 can choose to select one of the transaction data identifiers to complete the pending transaction. The user may also choose to enter a new PAN 311 that has not been linked to the user account. If user 101 selects one of the transaction data identifiers 307/309, the website sends server computer 105 a confirmation of which transaction data identifier was approved by user 101 to complete the pending transaction.

At step 6 of FIG. 1, gateway service provider 104 may communicate to server computer 105 whether user 101 selects/confirms one of the transaction data identifiers presented on webpage 301. In some embodiments, user 101 may be offered a choice to utilize auto-filled information such as billing address 325, shipping address 335, email address 345, and/or phone number 355. The auto-filled information is generally rendered on the website for viewing by user 101. The auto-filled information may be provided by server computer 105. User 101 may agree with and confirm the form-filled information (e.g., by activating a software button) and trigger a confirmation to be sent to server computer 105 (S304). In some cases, user 101 may reject, delete, and reenter any information in the viewable information fields 325, 335, 345, and/or 355.

At step 7, in response to the selection of a transaction data identifier, server computer 105 may send a corresponding payment token to and request a token cryptogram based on the payment token from payment processing network 107 (S305). The token may be associated with an account number of a payment account of user 101 that was identified by the transaction data identifier 307 or 309. In other words, if user 101 selects transaction data identifier 307, the token sent by server computer 105 to payment processing network 107 would be associated with the transaction data (PAN) having the last four digits as transaction data identifier 307. Similarly, if user 101 selects transaction data identifier 309, the token sent by server computer 105 to payment processing network 107 would be associated with the transaction data (PAN) having the last four digits as transaction data identifier 309. Server computer 105 may request that the payment processing network 107 to de-tokenize the token to resolve a real account number (e.g., PAN) to be utilized for the transaction. Server computer 105 may also request payment processing network 107 to generate a token cryptogram based on the sent token.

At step 8, payment processing network 107 may communicate with token vault 108 to de-tokenize the received token. For example, payment processing network 107 may access the mapping of tokens to account numbers stored by token vault 108 to retrieve the account number of user 101 associated with the token.

At step 9, token vault 108 may send the retrieved account number (e.g., PAN) to payment processing network 107. The account number may be associated with the payment account to be utilized for the transaction conducted by user 101.

At step 10, payment processing network 107 may generate a token cryptogram based on the token and send the token cryptogram to server computer 105. The token cryptogram may be generated by any suitable method and may be a one-time token cryptogram that is specific to the pending transaction (token cryptogram is only valid for use in the transaction). In some embodiment, the token cryptogram may be generated using an encryption key (e.g., a symmetric encryption key) that may be used with an encryption algorithm such as DES, TDES, AES, ECC, etc. The cryptogram may be generated using any suitable input data including one or more of a token, a timestamp, a transaction amount, etc.

At step 11, server computer 105 may send tokenized payment credentials associated with user 101 with the token cryptogram to the webpage operated by gateway service provider 104 (or merchant 103) (S306). In one embodiment, the token cryptogram is a Token Authentication Verification Value (TAVV). As discussed previously, the operating system or the browser displaying the webpage of user device 102 may be capable of identifying that the webpage is enabled to accept a payload that includes a token cryptogram. Consequently, gateway service provider 104 may support an additional information field for the token cryptogram received from payment processing network 107 during the transaction conducted by user 101. The additional information field may be a hidden data field that is not rendered for viewing by the user.

Referring again to FIG. 3, payload 319 that includes the token cryptogram and tokenized payment credentials of user 101 can be provided to hidden payment fields 315. Payload 319 may be encrypted. Hidden payment fields 315 are illustrated with dashed lines to indicate that they are not viewable by a user 101 of webpage 301. Hidden Payment Fields 315 may be configured to receive a token number, a token expiration date, the token cryptogram, a payment account reference (PAR), and other tokenized payment credentials.

At step 12, gateway service provider 104 may send any received transaction information to merchant 103 to process the transaction. The transaction may be continued if the token cryptogram is valid. In some embodiments, user 101 may receive a confirmation of payment from gateway service provider 104 (or merchant 103). Subsequently, payment processing of gateway service provider 104 with the received token payment credentials may be initiated for authorization (S307).

At step 13, merchant 103 may generate and send an authorization request message to acquirer computer 106. The authorization request message includes the token cryptogram and may include a unique identifier of the website and tokenized payment credentials.

At step 14, acquirer computer 106 may forward the authorization request message to payment processing network 107. The payment processing network 107 may then analyze the authorization request message and may perform any suitable authentication processing, including validation of the cryptogram in the authorization request message. This one or more inputs (e.g., the token, timestamp, transaction amount, etc.) that may be present in the authorization request message, and creating a cryptogram which can be compared against the cryptogram received in the authorization request message. In other embodiments, the cryptogram can be decrypted and the input data can be recovered and compared against data in the authorization request message. In other case, the cryptogram can be verified. If it is verified, than the authorization request message may be modified to include a flag which indicates that the cryptogram has been validated. In addition, the payment processing network 107 may take the tokenized payment credentials (e.g., including a payment token) and may retrieve the real payment credentials (e.g., a PAN) from the token vault. The modified authorization request message may also include the real credentials instead of the tokenized credentials.

At step 15, payment processing network 107 may forward the authorization request message to issuer computer 109, Issuer computer 109 may determine whether the transaction should be authorized and may generate an authorization response message including an authorization decision. As noted above, if the cryptogram was validated by the payment processing network 107, then this can give the issuer computer 109 assurance that the transaction is authentic. If the cryptogram was not validated by the payment processing network 107, then, the issuer computer 109 may want to perform additional authentication processing with respect to the user device 102 and/or the user of the user device 102 before authorizing the transaction. In some embodiments, issuer computer 109 may include other relevant information in the authorization response message, such as risk analysis information.

At step 16, issuer computer 109 may send the authorization response message to payment processing network 107. Payment processing network 107 and issuer computer 109 may communicate by any suitable communications network.

At step 17, payment processing network 107 may send the authorization response message to acquirer computer 106. Payment processing network 107 and acquirer computer 106 may communicate by any suitable communications network.

At step 18, acquirer computer 106 may send the authorization response message to merchant 103. Merchant 103 may determine whether to complete the transaction based on the received response which may include an approval or denial of the transaction. Acquirer computer 106 and merchant 103 may communicate by any suitable communications network.

At step 19, merchant 103 may send a confirmation to user device 102 if the transaction is approved. User device 102 may communicate with other entities, including merchant 103 and gateway service provider 104 by any suitable communications network.

At step 20, user device 102 may inform user 101 that the transaction has been completed. In some embodiments, user device 102 may present a notification (e.g., pop-up, audio, etc.) indicating the completion of the transaction. In other embodiments, the webpage utilized for the transaction may be updated with information indicating to user 101 that the transaction has been completed.

Figure 4:
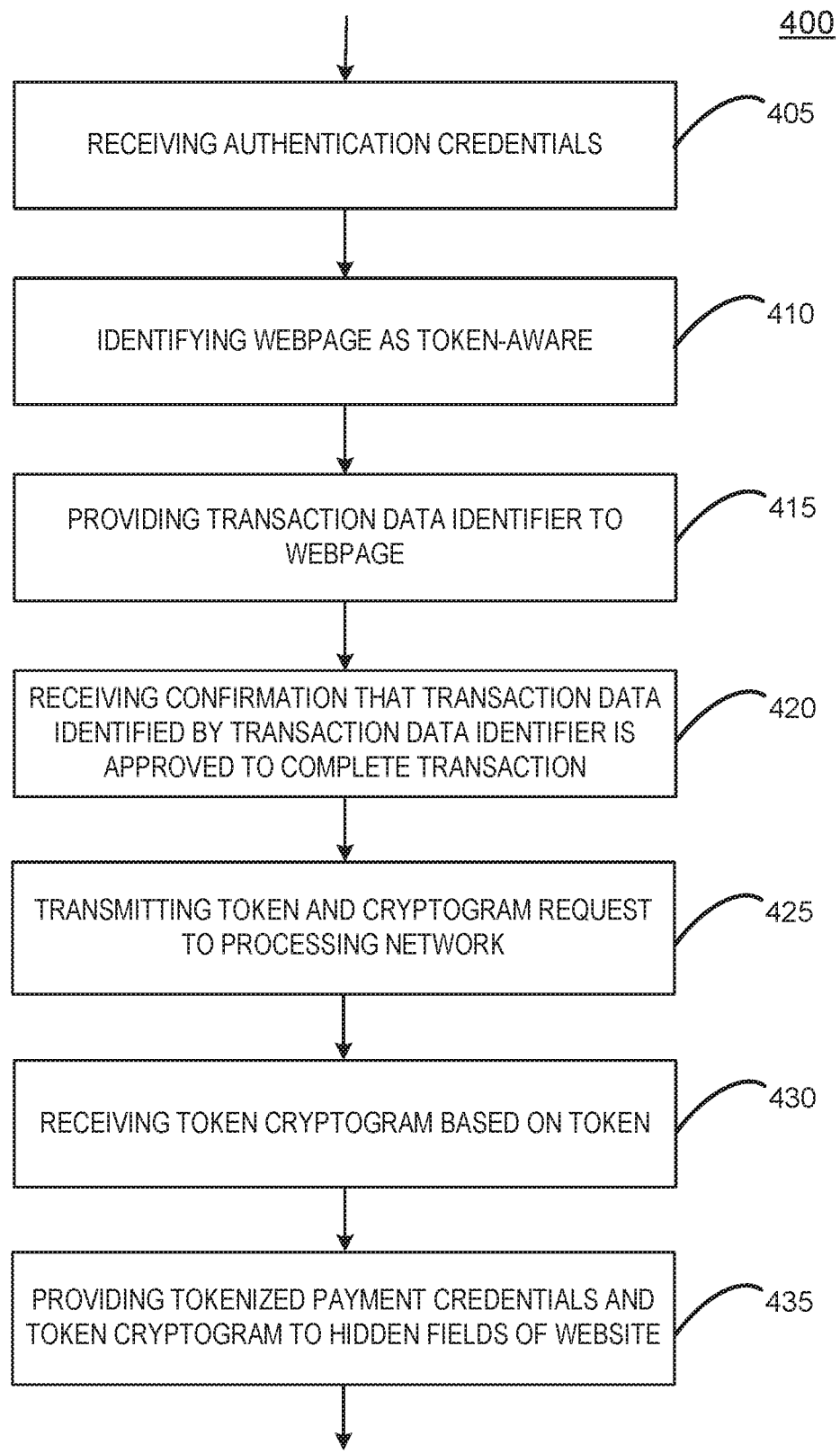
FIGS. 4 and 5 show example methods of facilitating a transaction that includes populating a hidden field of a webpage with a token cryptogram.

FIG. 4 illustrates a process 400 of performing a transaction that includes populating a hidden field of a browser with a token cryptogram. The process 400 is illustrated as a logical flow diagram, each operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be omitted or combined in any order and/or in parallel to implement this process and any other processes described herein.

Some or all of the process 400 (or any other processes described herein, or variations and/or combinations thereof) may be performed under the control of one or more computer systems configured with executable instructions and may be implemented as code (e.g., executable instructions, one or more computer programs or one or more applications). In accordance with at least one embodiment, the process 400 of FIG. 4 may be performed by server computer 105. The code may be stored on a computer-readable storage medium of server computer 105, for example, in the form of a computer program including a plurality of instructions executable by one or more processors. The computer-readable storage medium may be non-transitory.

In process block 405, authentication credentials are received by a server computer (e.g. server computer 105). The authentication credentials may be associated with a user account of an operating system or a web browser, for example. The server computer may be operated by a publisher of a browser. The server computer identifies that a website accessed by a user is token-aware, in process block 410. A transaction data identifier associated with the authentication credentials is provided to the website in process block 415. The transaction data identifier identifies underlying transaction data. In one embodiment, the transaction data identifier is the last four digits of a PAN and the underlying transaction data is the full PAN or tokenized version of the full PAN. The server computer may store or have access to the transaction data identifiers as they are associated with the authentication credentials and the user account. The user may have previously stored payment credentials (that include the transaction data identifiers) into the user account that the server computer maintains or has access to. The underlying transaction data may be payment credentials or tokenized versions of the payment credentials. The website may render one or more transaction data identifiers to a user of the website so that the user can select/confirm the transaction data the user desires to complete the transaction using the transaction data identifiers as a proxy for the actual transaction data.

In process block 420, the server computer receives a selection or confirmation that the transaction data identified by the transaction data identifier is approved by the user to complete the transaction. In process block 425, the server computer transmits a token and a cryptogram request to a processing network (e.g. payment processing network 107). The token is tokenized version of the transaction data that was identified by the transaction data identifier. In process block 430, a token cryptogram is received from the processing network. The token cryptogram is based on the token sent to the processing network. In process block 435, the token cryptogram and tokenized payment credentials are provided to the hidden fields of the webpage of the website. The hidden fields are not visible to the user viewing the webpage or website.

In one embodiment, the server computer assigns a unique identifier to the website and includes the unique identifier in the cryptogram request of process block 425. The unique identifier may be a randomly generated unpredictable number. The unique identifier is also included in the payload (e.g. payload 319) that is sent to the hidden fields of the webpage. When the merchant/PSP initiates an authorization request message that is forwarded to the payment processing network (steps 13 and 14 of FIG. 1) the authorization request can include the token cryptogram and the unique identifier. Therefore, the token cryptogram and the unique identifier will ultimately be forwarded back to the payment processing network, which gives the payment processing network further verification that the merchant/PSP that received the unique identifier and the token cryptogram is also the entity transmitting the authorization request message. Hence, as a technical advantage of the disclosure, the server computer including the unique identifier in the cryptogram request allows the processing network to link the token cryptogram that it generates with the unique identifier and then enforce a domain restriction by verifying the authenticity of the authorization request message by verifying the unique identifier and the token cryptogram are still paired together in the authorization request message.

Figure 5:
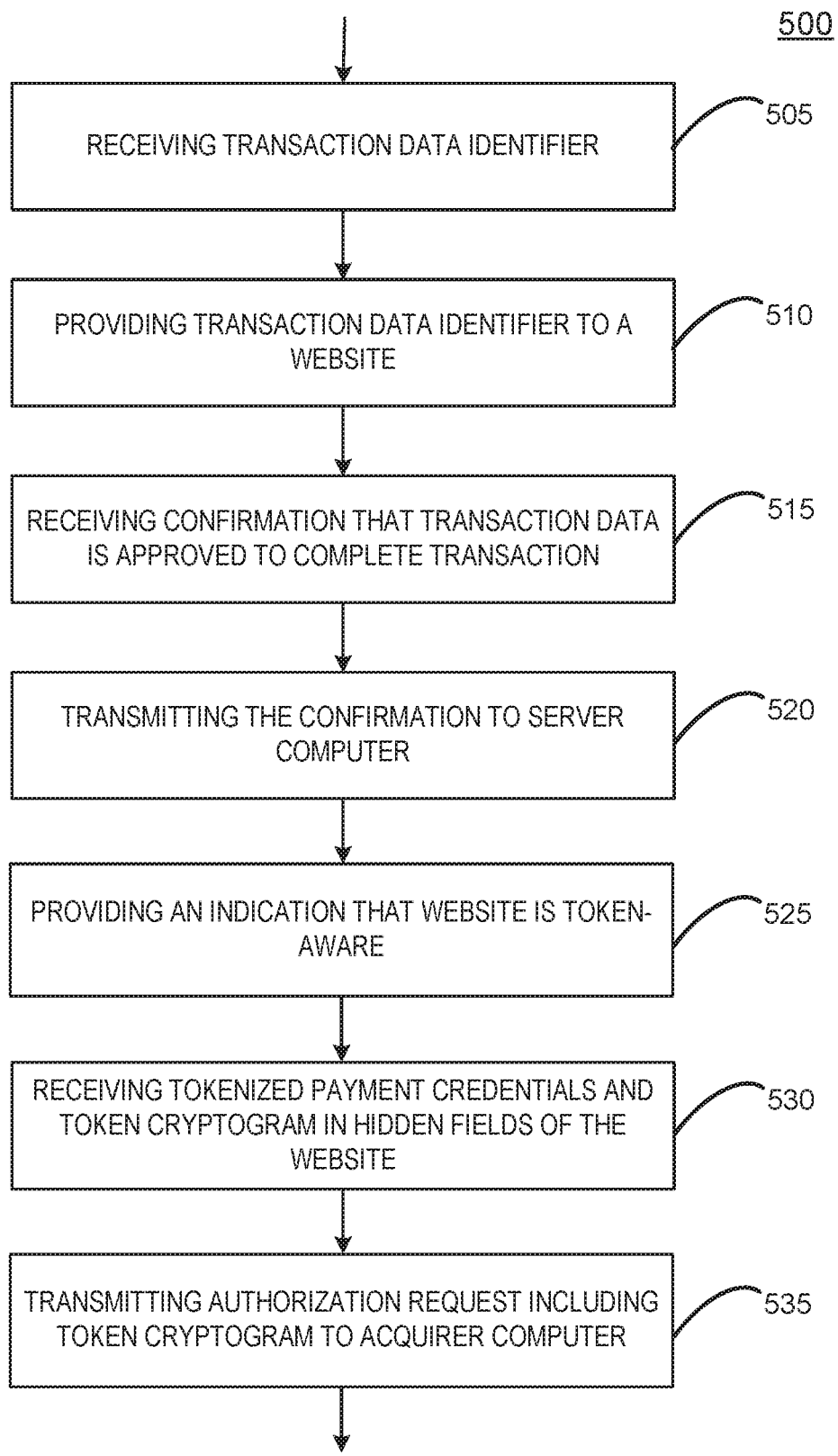

FIG. 5 illustrates a process 500 of performing a transaction that includes populating a hidden field of a browser with a token cryptogram. The process 500 is illustrated as a logical flow diagram, each operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be omitted or combined in any order and/or in parallel to implement this process and any other processes described herein.

Some or all of the process 500 (or any other processes described herein, or variations and/or combinations thereof) may be performed under the control of one or more computer systems configured with executable instructions and may be implemented as code (e.g., executable instructions, one or more computer programs or one or more applications). In accordance with at least one embodiment, the process 500 of FIG. 5 may be performed by merchant 103 and/or gateway service provider 104. The code may be stored on a computer-readable storage medium, for example, in the form of a computer program including a plurality of instructions executable by one or more processors. The computer-readable storage medium may be non-transitory.

In process block 505, a transaction data identifier (e.g. last four digits of a PAN) is received from a server computer (e.g. server computer 105). The transaction data identifier is associated with authentication credentials verified by the server computer. In process block 510, a transaction completion interface (e.g. 303) of a website is provided to a computing device (e.g. user device 102). The transaction data identifier is made visible to the viewer/user of the website. A confirmation is received from the user (process block 515) that the transaction data identified by the transaction data identifier is approved to complete a pending transaction. For example, the user may have an item in the user's cart ready for checking out. The confirmation is transmitted to the server computer in process block 520.

In process block 525, an indication is provided to the server computer that the website is token-aware (configured to accept a token cryptogram in hidden fields of a webpage of the website). In one embodiment, the indication is an HTML tag. In process block 530, tokenized payment credentials and a token cryptogram is received from the server computer in hidden fields of the webpage of the website. The hidden fields are not rendered for viewing by the user. In process block 535, an authorization request message is transmitted to an acquirer computer (e.g. acquirer computer 106). The authorization request message includes the tokenized payment credentials, the token cryptogram and a unique identifier of the website. The unique identifier of the website may be assigned to the website by the server computer.

After transmitting the authorization request message, an authorization response message may be received from the acquirer computer. The authorization response message either approves or declines the transaction. When the authorization response message approves the transaction, a transaction completion message may be sent from the merchant or PSP to the user's computing device.

Embodiments of the invention may provide a number of technical advantages. For example, integrating the use of a token cryptogram in a payload to a merchant checkout page can make a transaction more secure by not requiring the user to enter their PAN to complete a transaction. Rather, because the server computer 105 can provide the last four digits or other transaction data identifier to the merchant and have the user select the transaction data identifier as a proxy for the actual PAN, the server computer 105 nor the user provides the actual PAN (and other payment credentials) to the merchant 103 and/or gateway service provider 104. Instead, tokenized payment credentials and a token cryptogram are provided to the merchant and/or gateway service provider 104 to complete the transaction. Therefore, the entities (e.g. merchant and PSP) and networks connecting those entities never receive the PAN, which limits the opportunity for the PAN to be misappropriated. Yet another technical advantage is that the transaction friction of entering payment credentials into a browser (especially a mobile browser) is reduced in that the user need only select the account (represented by the last 4 digits of the PAN in some embodiments) that they prefer to use to complete the transaction and the rest of the payment details (e.g. shipping and billing address) may be auto form-filled in the viewable data fields of the checkout page while the token cryptogram and other sensitive data elements are in hidden data fields of the checkout page. The viewable data fields and the sensitive data elements in the hidden fields may then be easily packaged by the merchant and send as part of the authorization request. Embodiments that utilize hidden fields may add an additional layer of security in that the token cryptogram is not viewable on the webpage.

Although the above-noted examples relate to e-commerce payment transactions, embodiments of the invention are not so limited. For example, the use of a token-aware websites, tokens, and cryptograms as described above in the e-commerce payment examples could be used in other non-financial contexts, such as obtaining access to secure data. For instance, instead of a merchant, a person may wish to access his or her healthcare records at a medical institution. Rather than storing actual sensitive data such as social security numbers at the medical institution Website, the medical institution may store tokens associated with those social security numbers. A similar process as described above in the e-commerce example can be applied when a user wishes to access his or her health records at the medical institution.

A computer system that may be used to implement any of the entities or components described above may include subsystems such as a printer, keyboard, fixed disk (or other memory comprising computer readable media), monitor, which is coupled to a display adapter. The subsystems may be interconnected via a bus. Peripherals and input/output (I/O) devices, which couple to I/O controllers (which can be a processor or other suitable controller), can be connected to the computer system by any number of means known in the art, such as a serial port. For example, a serial port or network interface can be used to connect the computer apparatus to a wide area network such as the Internet, a mouse input device, or a scanner. The interconnection via system bus allows the central processor to communicate with each subsystem and to control the execution of instructions from a system memory or a fixed disk, as well as the exchange of information between subsystems. The system memory and/or the fixed disk may embody a computer readable medium. In some embodiments, the monitor may be a touch sensitive display screen. Processing logic of the computer system may have access to a computer readable medium and be configured to execute instructions stored in the computer readable medium. Processing logic may include processors, microprocessors, field-programmable gate arrays (FPGAs), Application-Specific Integrated Circuits (ASICs), or other suitable processing logic. The processing logic may be coupled to a network interface to facilitate sending and receiving network traffic via the network interface.

A computer system can include a plurality of the same components or subsystems, e.g., connected together by external interface or by an internal interface. In some embodiments, computer systems, subsystem, or apparatuses can communicate over a network. In such instances, one computer can be considered a client and another computer a server, where each can be part of a same computer system. A client and a server can each include multiple systems, subsystems, or components.

It should be understood that any of the embodiments of the present invention can be implemented in the form of control logic using hardware (e.g. an application specific integrated circuit or field programmable gate array) and/or using computer software with a generally programmable processor in a modular or integrated manner. As used herein, a processor includes a single-core processor, multi-core processor on a same integrated chip, or multiple processing units on a single circuit board or networked. Based on the disclosure and teachings provided herein, a person of ordinary skill in the art will know and appreciate other ways and/or methods to implement embodiments of the present invention using hardware and a combination of hardware and software.

Any of the software components or functions described in this application may be implemented as software code to be executed by a processor using any suitable computer language such as, for example, Java, C, C++, C#, Objective-C, Swift, or scripting language such as Perl or Python using, for example, conventional or object-oriented techniques. The software code may be stored as a series of instructions or commands on a computer readable medium for storage and/or transmission, suitable media include random access memory (RAM), a read only memory (ROM), a magnetic medium such as a hard-drive or a floppy disk, or an optical medium such as a compact disk (CD) or DVD (digital versatile disk), flash memory, and the like. The computer readable medium may be any combination of such storage or transmission devices.

Such programs may also be encoded and transmitted using carrier signals adapted for transmission via wired, optical, and/or wireless networks conforming to a variety of protocols, including the Internet. As such, a computer readable medium according to an embodiment of the present invention may be created using a data signal encoded with such programs. Computer readable media encoded with the program code may be packaged with a compatible device or provided separately from other devices (e.g., via Internet download). Any such computer readable medium may reside on or within a single computer product (e.g. a hard drive, a CD, or an entire computer system), and may be present on or within different computer products within a system or network. A computer system may include a monitor, printer, or other suitable display for providing any of the results mentioned herein to a user.

The above description is illustrative and is not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

One or more features from any embodiment may be combined with one or more features of any other embodiment without departing from the scope of the invention.

A recitation of "a", "an" or "the" is intended to mean "one or more" unless specifically indicated to the contrary.

All patents, patent applications, publications, and descriptions mentioned above are herein incorporated by reference in their entirety for all purposes. None is admitted to be prior art.

What is claimed:

1. A method of performing a payment transaction comprising:
receiving, by a user device, credentials of a user accessing a merchant website associated with a merchant;
transmitting, by the user device, the credentials of the user to a server computer;
receiving, by the user device, a transaction data identifier identifying underlying payment transaction data associated with the credentials, based upon an identification by the server computer that the merchant website accessed by the user is a token-aware website, wherein a token-aware website is configured to accept a token cryptogram to facilitate a payment transaction in data fields of a webpage of the merchant website, wherein the merchant website is identified as token-aware based on a unique identifier of the merchant website identified by the server computer and transmitted to a processing network to verify the unique identifier of the merchant website, and wherein the payment transaction data comprises tokenized credentials and the transaction data identifier comprises a last four digits of a Primary Account Number (PAN);
receiving, by the user device from the user, a confirmation that the payment transaction data identified by the transaction data identifier is approved by the user to complete the payment transaction; and
transmitting, by the user device to the server computer, the confirmation of the user approval,
thereby causing the server computer to provide the tokenized credentials and a token cryptogram to the data fields of the webpage of the merchant website to conduct the payment transaction, wherein the tokenized credentials are provided to the data fields of the webpage only when the merchant website is identified as token-aware.

2. The method of claim 1, wherein the server computer further:
assigns the unique identifier of the merchant website to the merchant website; and
provides the unique identifier of the merchant website to the data fields of the webpage, wherein the data fields are not visible to the user viewing the merchant website.

3. The method of claim 1, wherein the data fields of the webpage of the merchant website are hidden data fields.

4. The method of claim 1, wherein the merchant website is identified as token-aware based on analysis of an HTML (HyperText Markup Language) tag of the merchant website, wherein the HTML tag also verifies a trusted identity of the merchant website.

5. The method of claim 1, wherein the token cryptogram is received by the server computer responsive to a cryptogram request comprising the unique identifier of the merchant website.

6. The method of claim 1, wherein the tokenized credentials are linked to the payment transaction data identified by the transaction data identifier.

7. A user device comprising:
processing logic; and
a non-transitory computer-readable medium accessible to the processing logic, the non-transitory computer-readable medium comprising code, executable by the processing logic, for implementing a method comprising:
receiving credentials of a user accessing a merchant website associated with a merchant;
transmitting the credentials of the user to a server computer;
receiving a transaction data identifier identifying underlying payment transaction data associated with the credentials, based upon an identification by the server computer, that the merchant website accessed by the user is a token-aware website, wherein a token-aware website is configured to accept a token cryptogram to facilitate a payment transaction in data fields of a webpage of the merchant website, wherein the merchant website is identified as token-aware based on a unique identifier of the merchant website identified by the server computer and transmitted to a processing network to verify the unique identifier of the merchant website, and wherein the payment transaction data comprises tokenized credentials and the transaction data identifier comprises a last four digits of a Primary Account Number (PAN); and
transmitting to the server computer, a confirmation that the payment transaction data identified by the transaction data identifier is approved by the user to complete the payment transaction,
thereby causing the server computer to provide the tokenized credentials and a token cryptogram to the data fields of the webpage of the merchant website to conduct the payment transaction, wherein the tokenized credentials are provided to the data fields of the webpage only when the merchant website is identified as token-aware.

8. The user device of claim 7, wherein the data fields of the webpage of the merchant website are hidden data fields.

9. A method of performing a payment transaction comprising:
receiving, by a processing network computer from a server computer, a unique identifier of a merchant website;
verifying, by the processing network computer based on the unique identifier, that the merchant website is a token-aware website, wherein a token-aware website is configured to accept a token cryptogram to facilitate a payment transaction in data fields of a webpage of the merchant website;
transmitting, by the processing network computer to the server computer, a verification that the merchant website is token-aware;
responsive to transmitting the verification and responsive to user selection of a transaction data identifier, receiving, by the processing network computer, a token linked to payment transaction data for conducting a transaction on the merchant website for a user, wherein the payment transaction data comprises tokenized credentials and the transaction data identifier comprises a last four digits of a Primary Account Number (PAN);
generating, by the processing network computer, a token cryptogram based on the token; and
transmitting, by the processing network computer to the server computer, the token cryptogram, thereby causing the server computer to provide the tokenized credentials and the token cryptogram to the data fields of the webpage of the merchant website to conduct the payment transaction, wherein the tokenized credentials are provided to the data fields of the webpage only when the merchant website is identified as token-aware.

10. The method of claim 9, further comprising:
accessing, by the processing network computer, a mapping of tokens to account numbers stored by a token vault to retrieve an account number of the user associated with the tokenized credentials; and
transmitting, by the processing network computer to the server computer, the retrieved account number to be utilized for the transaction.

11. The method of claim 9, wherein generating the token cryptogram comprises:
using an encryption key with an encryption algorithm based on the tokenized credentials and one or more of a timestamp and a transaction amount.

12. The method of claim 9, wherein the token cryptogram is a one-time token cryptogram that is specific to the transaction.

13. The method of claim 9, further comprising:
receiving, by the processing network computer from an acquirer computer, an authorization request message comprising the token cryptogram;
analyzing, by the processing network computer, the authorization request message including verifying the token cryptogram;
forwarding, by the processing network computer to an issuer computer, the authorization request message based on verifying the token cryptogram;
receiving, by the processing network computer from the issuer computer, an authorization response message in response to the authorization request message; and
transmitting, by the processing network computer to the acquirer computer, the authorization response message for completing the transaction.

14. The method of claim 9, wherein the data fields of the webpage of the merchant website are hidden data fields.

15. The method of claim 9, wherein:
the unique identifier of the merchant website includes an HTML (HyperText Markup Language) tag;
and the unique identifier of the merchant website also serves to verify the merchant website as a trusted website.

\* \* \* \* \*